United States Patent
Koo

(10) Patent No.: US 10,810,645 B2
(45) Date of Patent: Oct. 20, 2020

(54) LOCATION-BASED REMOTE CUSTOMER SERVICE

(71) Applicant: John C. S. Koo, Los Angeles, CA (US)

(72) Inventor: John C. S. Koo, Los Angeles, CA (US)

(*) Notice: Subject to any disclaimer, the term of this patent is extended or adjusted under 35 U.S.C. 154(b) by 0 days.

(21) Appl. No.: 16/507,192

(22) Filed: Jul. 10, 2019

(65) Prior Publication Data

US 2019/0333124 A1   Oct. 31, 2019

Related U.S. Application Data

(63) Continuation of application No. 15/263,180, filed on Sep. 12, 2016, now Pat. No. 10,395,290.

(60) Provisional application No. 62/253,363, filed on Nov. 10, 2015.

(51) Int. Cl.
*G06Q 30/00* (2012.01)
*G06Q 30/06* (2012.01)
*H04M 1/725* (2006.01)
*H04M 3/523* (2006.01)
*H04W 4/80* (2018.01)
*H04L 12/28* (2006.01)

(52) U.S. Cl.
CPC .... *G06Q 30/0613* (2013.01); *H04M 1/72522* (2013.01); *H04M 3/5233* (2013.01); *H04W 4/80* (2018.02); *H04L 12/2854* (2013.01)

(58) Field of Classification Search
None
See application file for complete search history.

(56) References Cited

U.S. PATENT DOCUMENTS

| 6,587,835 B1 * | 7/2003 | Treyz ............... G06Q 20/12 |
| | | 705/14.64 |
| 7,171,378 B2 * | 1/2007 | Petrovich ......... G06Q 10/087 |
| | | 705/26.43 |
| 9,047,631 B2 | 6/2015 | Sridharan et al. |
| 2004/0153368 A1 | 8/2004 | Freishtat et al. |
| (Continued) | | |

FOREIGN PATENT DOCUMENTS

WO   WO2008084406   7/2008

OTHER PUBLICATIONS

Printout from http://www.economist.com/node/21543470 on Apr. 5, 2012.

(Continued)

*Primary Examiner* — Mila Airapetian
(74) *Attorney, Agent, or Firm* — Joseph G Swan PC

(57) ABSTRACT

Provided are, among other things, systems, methods and techniques for providing remote location-based customer service for in-store customers. One such system includes: (a) a central server; (b) wireless transceivers coupled to the central server at different locations within each of multiple different retail shopping sites; and (c) handheld wireless devices, carried by customers at such retail shopping sites and in wireless communication with such wireless transceivers. Each of the handheld wireless devices is configured with a user interface that allows a customer to designate a user-interface element to request a customer-service session. Upon designation of the user-interface element on one of such handheld wireless devices, the request is forwarded to the central server. The central server establishes a two-way real-time communication link between the handheld wireless device and a customer-service representative.

20 Claims, 10 Drawing Sheets

(56) References Cited

U.S. PATENT DOCUMENTS

| | | |
|---|---|---|
| 2006/0239675 A1 | 10/2006 | Iizuka et al. |
| 2007/0027806 A1 | 2/2007 | Sands et al. |
| 2007/0031149 A1 | 2/2007 | Sasai et al. |
| 2008/0292320 A1 | 11/2008 | Pederson |
| 2011/0176803 A1 | 7/2011 | Song et al. |
| 2012/0032843 A1 | 2/2012 | Lee et al. |
| 2012/0050061 A1 | 3/2012 | Timm et al. |
| 2012/0116861 A1 | 5/2012 | Dobyns |
| 2013/0198039 A1* | 8/2013 | Sridharan .......... G06Q 30/0613 705/26.44 |
| 2013/0217332 A1 | 8/2013 | Altman et al. |
| 2013/0317916 A1 | 11/2013 | Gopalakrishnan et al. |
| 2017/0076306 A1* | 3/2017 | Snider .................. G06Q 20/325 |
| 2017/0091819 A1* | 3/2017 | Krause ............... G06Q 30/0259 |

OTHER PUBLICATIONS

Printout from http://en.wikipedia.org/wiki/Li-Fi on Apr. 5, 2012.
Printout from http://www.newscientist.com/article/mg21128225.400-will-lifi-be-the-new-wifi.html on Apr. 5, 2012.
Rodney S. Tucker, Gadi Eisentstein, Steven K. Korotky, "Optical Time-Division Multiplexing for Very High Bit-Rate Transmission", Nov. 1988 Journal of Lightwave Technology, vol. 6 No. 11 pp. 1737 and 1747-1749.
Printout of webpage at http://www.merriam-webster.com/dictionary/game, Merriam-Webster Online Dictionary definition of "game", on Aug. 22, 2013.
Printouts from http://aisle411.com/ and subpages thereof on Oct. 20, 2016.
Printout of webpage at http://www.aislelabs.com/products/flow/ on Oct. 20, 2016.
Prosecution history of, including prior art cited in, parent U.S. Appl. No., 15/263,180, filed Sep. 12, 2016.

* cited by examiner

LOCATION-BASED REMOTE CUSTOMER SERVICE

FIELD OF THE INVENTION

The present invention pertains, among other things, to systems, methods and techniques for providing virtual or remote customer service, e.g., based on a customer's location within a store or other retail sales environment.

BACKGROUND

Typically, conventional brick-and-mortar retail stores make available on-site a number of sales associates to assist customers who might need help. These sales associates often are expected to be very familiar with the store's products and are employed on the assumption that the advice they provide will (1) add value to a customer's experience, thereby resulting in increased current sales, as well as an increased likelihood that customers will return to the store, and/or (2) help the customer make better-informed purchasing decisions, thereby resulting in decreased returns (i.e., decreased instances in which a purchased product fails to meet the customer's needs and/or expectations) and, therefore, decreased costs for the store. If the additional sales and/or the reduced costs from decreased returns sufficiently increase net revenues beyond the costs of the sales associate's compensation, the store can be more profitable. Having a knowledgeable sales associate can be particularly important with respect to certain specialized products (e.g., hardware, household appliances, electronics, fashion, or items pertaining to specific arts or skills).

Unfortunately, the present inventor has discovered several shortcomings with the conventional approaches to providing in-store customer service. For example, many brick-and-mortar stores try to diversify the products they sell in an attempt to increase overall traffic and/or to take advantage of cross-selling opportunities. However, such increasing product diversity typically requires (1) increased training of sales associates to handle a larger number of different products and/or (2) employing a larger number of specialized sales associates having different areas of expertise. Either approach can be very expensive for the retailer. In addition, irrespective of the amount of training provided, the depth of knowledge possessed by any individual sales associate (or even all of them combined) often will be insufficient to cover all possible situations. Still further, the present inventor has discovered that the conventional approach often results in a great deal of inefficiency because it can be difficult to anticipate how many sales associates will be needed at any particular time, and this problem is exacerbated when an appropriate mix of sales associates with different subject-matter expertise needs to be scheduled for the entire time that the store is open for business. Understaffing (either overall or in some particular subject-matter area, section or department) can result in lost sales, dissatisfied customers and subsequent increased returns, while overstaffing can result in excessive payroll expenditures.

SUMMARY OF THE INVENTION

The present invention addresses these problems, e.g., by providing systems, methods and techniques in which customer service for a variety of different retail sales sites, and even different portions of different retail sales sites, can be centralized, thereby providing significantly greater efficiencies. Specifically, such approaches often can provide for an improved overall customer experience (e.g., better quality customer service and/or increased customer choice) while also reducing staffing costs and providing a retailer with other revenue opportunities.

Thus, one specific embodiment of the present invention is directed to a system for providing remote location-based customer service for in-store customers, which includes: (a) a central server; (b) wireless transceivers coupled to the central server and disposed at different locations within each of multiple different retail shopping sites; and (c) handheld wireless devices, carried by customers at such retail shopping sites and in wireless communication with such wireless transceivers. Each of the handheld wireless devices is configured with a user interface that allows a customer to designate a user-interface element to request a customer-service session. Upon designation of the user-interface element on one of such handheld wireless devices, the request is forwarded to the central server by the wireless transceiver with which the handheld wireless device is communicating. Upon receipt of such a request, the central server establishes a two-way real-time communication link between the handheld wireless device and a customer-service representative who has been selected based on an area covered by, or an identifier for, such wireless transceiver.

The various embodiments of the present invention often can provide better and less expensive customer service than is conventionally available. At the same time, a system according to the present invention often can provide closer and more-direct interactions between, e.g., the various suppliers of products and services (e.g., manufacturers, wholesalers, distributors) and their ultimate customers, which can ultimately result in improved products and services, as well as better communications regarding them.

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

DESCRIPTION OF THE PREFERRED EMBODIMENT(S)

The present application claims priority to U.S. Provisional Patent Application Ser. No. 62/253,363, filed on Nov. 10, 2015. In addition, the present invention is related to U.S. patent application Ser. Nos. 13/559,372 (filed Jul. 26, 2012, now U.S. Pat. No. 8,924,255), Ser. No. 13/787,737 (filed Mar. 6, 2013, now abandoned) and Ser. No. 13/954,319 (filed Jul. 30, 2013, now U.S. Pat. No. 9,270,627). All the foregoing applications (sometimes collectively referred to herein as the "Related Applications") are incorporated by reference herein as though set forth herein in full.

For ease of reference only, the present disclosure is divided into sections. Generally speaking, the subject matter of each section is indicated by that section's heading.

Real-Time Live Customer Service Links

Figure 1:
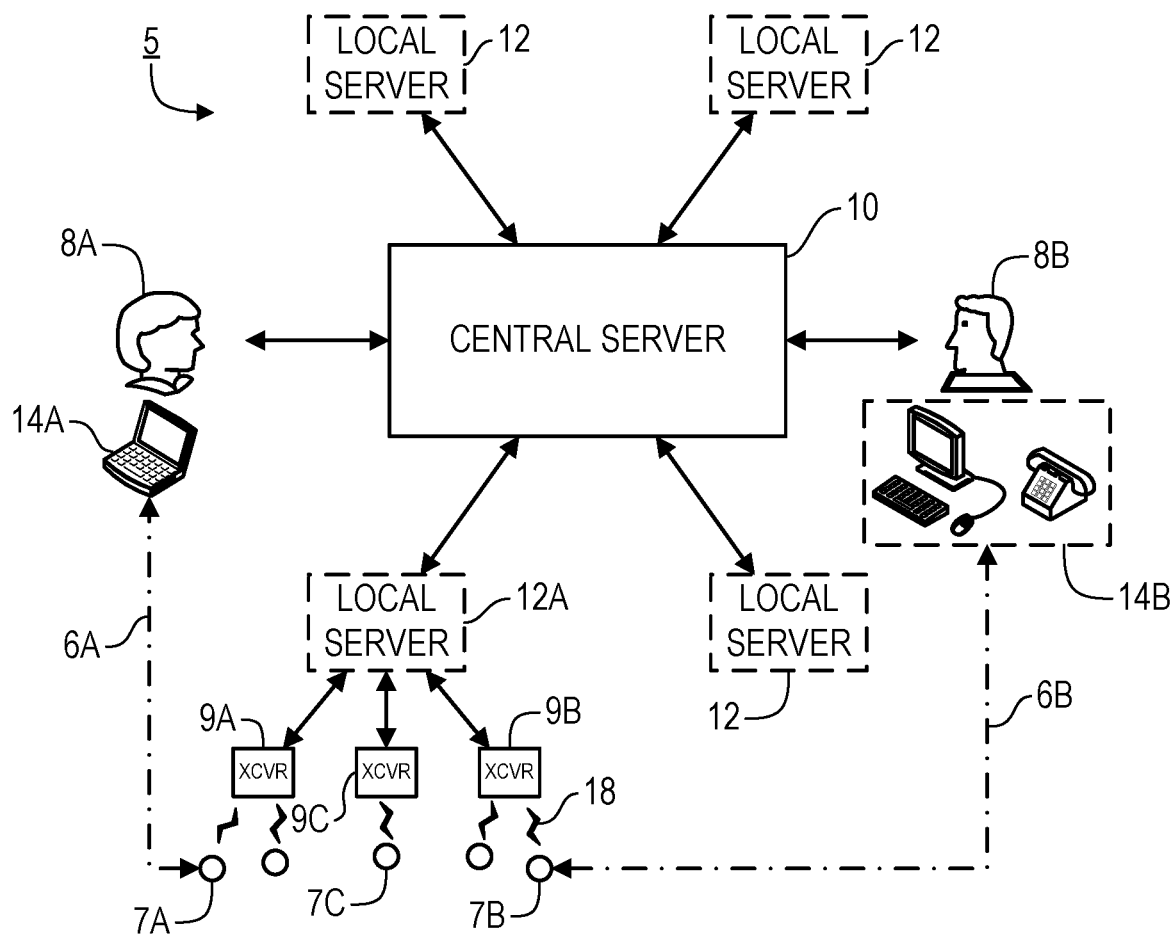
FIG. 1 is a block diagram of a system for providing on-demand communication links between individuals in one set (i.e., users) and individuals in another set (e.g., advisors or customer-service representatives).

FIG. 1 is a block diagram of a system 5 for providing, among other things, on-demand communication links between each of a variety of different networked individuals 7 (e.g., 7A-C), e.g., users of a particular type, on one hand, and individual advisors 8 (e.g., 8A&B), or other individuals within a second set, on the other, who preferably have different subject-matter expertise among them. As discussed in greater detail below, system 5 can be used, e.g., for providing remote customer service to customers of traditional physical (i.e., brick-and-mortar) retail shopping sites (e.g., individual stores, malls, other groups of individual stores, etc.). In this embodiment, the individual users 7 are customers and the individuals 8 have different areas of expertise with respect to the products or services provided by such shopping sites.

Generally speaking, the following discussion focuses on such a retail-shopping-site embodiment and uses terminology appropriate to that embodiment; however, no lack of generality is intended. Rather, in each instance, the embodiment-specific terms (e.g., "customer" on one hand or "customer-service representative" on the other) may be replaced with the more-generalized terms (e.g., "end-user" or "advisor", respectively, or "individual" or "user" for someone within either category). Typically, a "retail shopping site", as that term is used herein, refers to a single standalone enclosed retail store, but it can also encompass a retail shopping center or mall (including multiple separate and/or independent stores), an outdoor retail location (such as a swap meet), or any other retail shopping/sales configuration that includes one or more independent retailers, and can even encompass an individual vending machine and/or any other type of device, system or location pursuant to which products and/or services are provided (e.g., rental dispensing machines, unattended automobile parking lots or structures, or unattended carwashes), typically in exchange for money. As indicated elsewhere herein, a system 5 can be used in connection with any commercial or non-commercial physical sites that provide any products, services, information and/or experiences.

Generally speaking, system 5 is configured for establishing on-demand real-time two-way communications links 6 (such as links 6A&B) between various individual networked users (which are customers in the current embodiment) 7 (such as networked customers 7A-C), on one hand, and individual experts or advisors (which are customer-service representatives in the current embodiment) 8 (such as customer-service representatives 8A&B), on the other. For this purpose, system 5 includes a number of wireless transceivers 9 that are coupled to (or in communication with) a central server 10. The wireless transceivers 9 preferably are provided in various locations and, more preferably, are dispersed among geographically separate sites (which, again, typically are retail shopping/sales sites in the current embodiment), and each such wireless transceiver 9 preferably is used for real-time bidirectional wireless communication with any networked users 7 that are within its wireless range.

Optionally, groups of the wireless transceivers 9 (such as some or all of the wireless transceivers, including wireless transceivers 9A-C, within a single retail sales site) may be coupled to a local server 12 (e.g., server 12A in the current example) which, in turn, is coupled to the central server 10. Alternatively, for any given site or for any transceiver(s) 9, the local server 12 may be omitted, with the individual wireless transceivers 9 communicating directly with central server 10 or communicating with it through intermediate routers and/or other networked devices. Use of a local server 12 typically is preferred because, e.g., it can provide centralized functionality for communicating with central server 10, for managing all of the wireless transceivers 9 within a given retail shopping site or any portion of it (e.g., classifying each such wireless transceiver 9 based on the types of products located within the area that it covers and then uploading information regarding such individual transceivers 9 and the site overall to the central server 10), and for monitoring (and maintaining information regarding) interactions between the networked users 7 and the advisors 8, and therefore often can provide significant efficiencies. In either event, the individual wireless transceivers 9 typically communicate with the central server 10 via the Internet and/or another wide-area network (e.g., through a local area network, a local server 12 and/or in conjunction with any other communication network(s) and/or system(s)).

Although: (1) only one or two networked customers 7 are shown in FIG. 1 as being in communication with any given wireless transceiver 9, (2) only a few wireless transceivers 9 are shown as coupled to a single local server 12A, and (3) only four local servers 12 and two customer-service representatives 8 are shown in FIG. 1, this depiction is simply for ease of illustration. Ordinarily, there will be tens (e.g., at least 20), hundreds (e.g., at least 200) or thousands (e.g., at least 2,000) of wireless transceivers 9 coupled to central server 10, with each being in wireless communication with any number of networked users 7 at any given time, and there may be more than 10-100 customer-service representatives 8 available at any given time, often each with his/her own area of expertise (e.g., in different kinds of products and/or services). Similarly, where local servers 12 are used, each may have any number of wireless transceivers 9 coupled to them, such as at least 10-50 wireless transceivers 9 (e.g., covering an entire retail shopping site or any portion thereof, such as an entire department within such a site).

Figure 2:
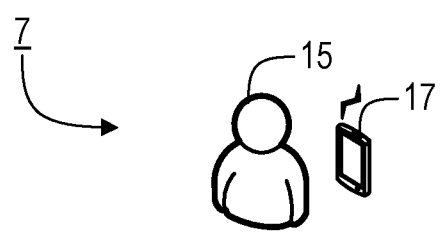
FIG. 2 illustrates a representative networked user of a system according to the present invention, with the individual user communicating within the system using his or her handheld wirelessly networked electronic device.

As discussed in greater detail below, central server 10 preferably establishes a real-time two-way communication link 6A between a given networked customer (e.g., customer 7A) and an individual customer-service representative (e.g., customer-service representative 8A), upon demand by such networked customer 7A, with the customer-service representative 8A having been selected based on the location of the networked customer 7A. In this regard, as shown in FIG. 2, each networked customer 7 typically comprises an individual user (e.g., customer) 15 interacting with and communicating through a wirelessly networked handheld electronic device 17, such as a tablet computer or smartphone, running a communication application (or app) that provides a user interface 70 (e.g., including any of the user-interface pages 70A-D shown in FIGS. 6 and 10-12, respectively), communicates with central server 10 and with the electronic device(s) 14 of a selected customer-service representative 8, and/or provides other client-side functionality within system 5.

As a result of system 5, individual person-to-person interactions between customers 15 and customer-service representatives 8 can be greatly facilitated. For example, as compared to conventional approaches, customers 15 often will be able to more quickly and easily contact a knowledgeable customer-service representative 8 and, at the same time, avoid being approached by salespeople when they do not in fact need or want assistance. System 5 also can benefit retail shopping sites both by more efficiently providing customer service (providing on-demand service) and by avoiding impressions that their employees are too pushy.

Typically, upon receiving a request from a customer 15's wireless electronic device 17, central server 10 establishes a communication link 6 (e.g., link 6A or 6B) between such device 17 and one or more networked electronic devices 14 used by an appropriate customer-service representative 8 (e.g., laptop computer 14A used by customer-service representative 8A or either or both of devices 14B, including a desktop computer and a landline telephone, used by customer-service representative 8B). In the preferred embodiments, central server 10 establishes at least a two-way audio link 6 between the devices 14 and 17, preferably using voice over Internet protocol (VOIP) across the wireless connection 18 between the networked user device 17 and the corresponding wireless transceiver 9 and then across the Internet or another wide-area network (either directly or by routing such link 6 through a local server 12 and/or through central server 10).

Alternatively, or in addition, any other type of communication media, channel and/or methodology may be used. For instance, central server 10 might simply provide a telephone number for the selected customer-service representative 8 to the provided user app running on the customer's device 17, which then automatically dials it to establish the link 6 (i.e., with no further participation by server 10, server 12, transceiver 9 or any other component of system 5). In addition, or instead, central server 10 may provide connection information (e.g., Internet Protocol or IP addresses) to device(s) 14 and/or 17 for establishing a link to exchange other kinds of digital information (e.g., as discussed in greater detail below). Generally speaking, any communication link 6 (or any portion of it) may be routed through any of wireless transceiver 9, central server 10 and/or local server 12 (if used), or instead may simply be initiated by such device(s) 9, 10 and/or 12 with no subsequent participation by such device(s) (e.g., using existing telephone infrastructure and/or social-networking services). One benefit of routing such communications through central server 10, or at least having central server 10 monitor such communications, is that the communications can be centrally monitored and the resulting information used to improve future communications (e.g., by supplementing or modifying the training provided to representatives 8) and/or to make better decisions about which customer-service representative 8 to select in a given situation.

The wireless connections 18 between the networked user 7 and the corresponding wireless transceiver 9 can be implemented using any of a variety of different wireless technologies and/or protocols, such as modulation of light (e.g., as described in detail in the Related Applications), which currently is preferred for the reasons set forth in the Related Applications, Wi-Fi (e.g., using low power for short range communication), Bluetooth, or a near-field communication (NFC) protocol. In certain embodiments, one or more of the wireless transceivers 9 has the ability to establish communications using any (or any combination) of a plurality of different technologies and/or protocols (such as any of the foregoing), so as to accommodate the largest possible number of user devices 17 (having different capabilities) and/or situations (e.g., when light-based communication is inhibited by physical barriers, switching to Bluetooth or some other technology and/or protocol).

Generally speaking, however, in the preferred embodiments such connections 18 are short-range, e.g., with an unobstructed effective wireless range (i.e., when there are no significant physical obstacles to the wireless connection) of not more than a distance of 50-100 feet and, more preferably, not more than a distance of 10-40 feet, and/or with an effective wireless range that is confined to a single shopping aisle (e.g., the entire aisle or a portion thereof) within the retail shopping site in which such transceivers 9 are located. Typically, each such wireless transceiver 9 (or at least each of the majority of them) cover not more than 500-1,000 square feet and, more preferably, not more than 100-500 square feet. Confinement to a single shopping aisle often can be readily accommodated by appropriately selecting the communications technology, e.g., using light-based transmissions (e.g., as described in the Related Applications) or similar wavelength radiation (e.g., infrared or ultraviolet), with the shelves that define a shopping aisle blocking the communications transmissions (e.g., light) from unduly extending into an adjacent aisle. Benefits of using short-range wireless communications often include: (1) reduced power demands on the user's device 17 and (2) the ability to more accurately locate the user (e.g., based solely on the location of the wireless transceiver(s) 9 with which the user's device 17 currently is communicating and/or is capable of communicating). However, as discussed below, in alternate embodiments identification of the location of the user 15 is performed using other techniques and/or means, in which case a smaller number of transceivers 9 with greater range might be more optimal.

Also, in the present embodiment, transceivers 9 and local servers 12 are used to establish contact with the central server 10. Advantages of this approach include: (1) the avoidance of requiring the users 15 to consume cell data; (2) the ability to also use the transceivers 9 (particularly if they are short-range) to identify the customer's location within the retail or other site; and (3) the ability for the managers or operators of the site (e.g., retail site) to capture and/or monitor the communications from the users 15 within the site (e.g., for use in improving the customer experience). However, in alternate embodiments, both the transceivers 9 and the local servers 12 are omitted, and the networked users 7 contact central server 10 without the use of on-site communications equipment, e.g., by communicating through a cellular connection to the Internet, thereby avoiding the need for on-site communications hardware.

Figure 3:
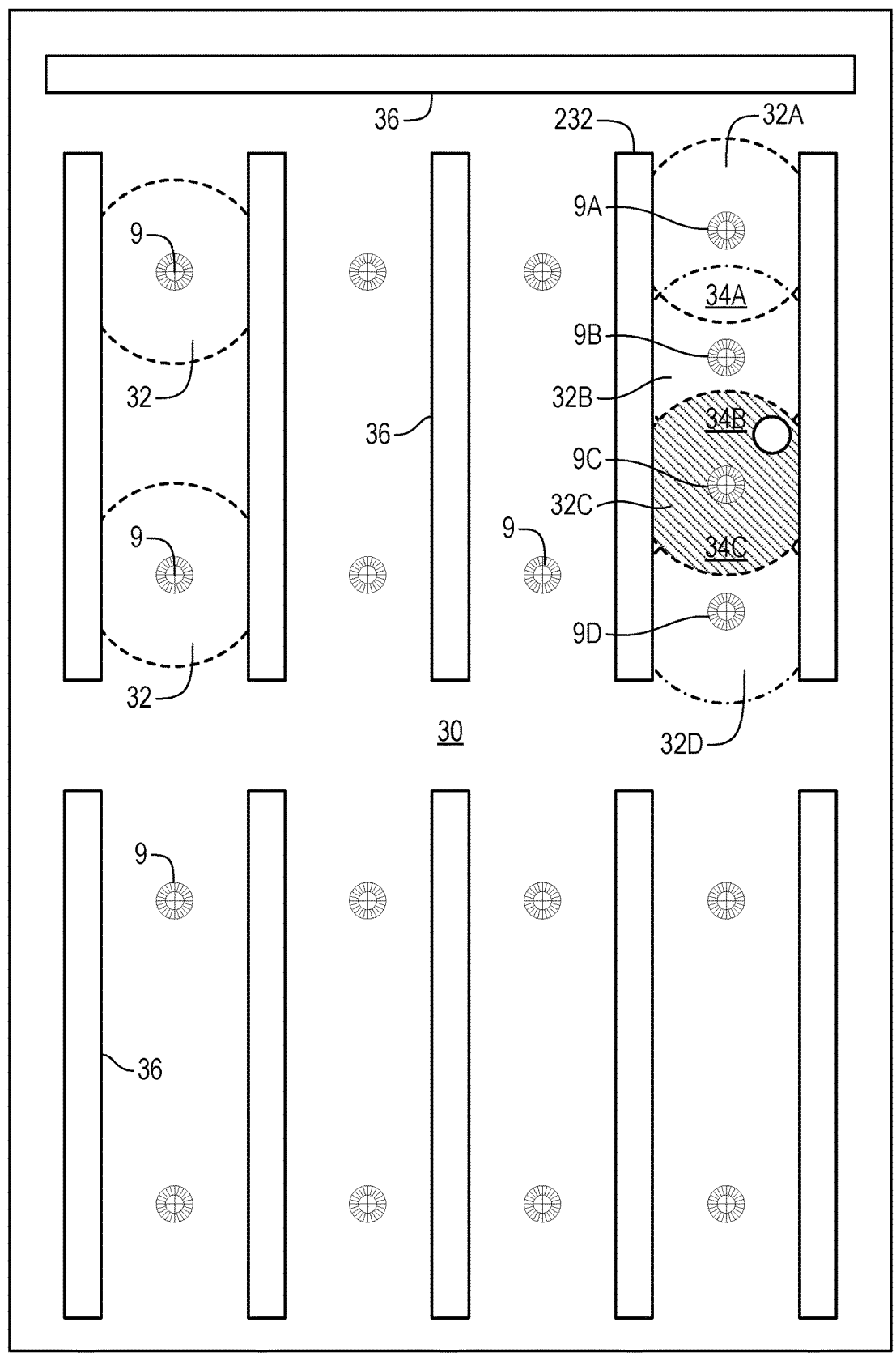
FIG. 3 is a top plan view of a retail space that uses overhead wireless transceivers.

FIG. 3 is a top plan view of a space 30 (in the present embodiment, a retail space) into which a plurality of wireless transceivers 9 have been installed. In this specific embodiment, the wireless transceivers 9 include light sources (typically light-emitting diodes, or LEDs) for transmitting messages and light sensors (e.g., photodiodes or phototransistors) for receiving them, e.g., as discussed in the Related Applications. However, as noted above, any other technologies and/or protocols (e.g., those noted elsewhere herein), or combinations of technologies and/or protocols, instead may be used. For example, wireless transceivers 9 might transmit information to a particular networked user 7 using one technology (e.g., light modulation) and receive information communicated from such networked user 7 (e.g., either solely or primarily) using a different technology (e.g., Bluetooth, NRC or Wi-Fi). Such an approach might be desirable, for example, if it cannot be ensured that a light source (e.g., the light typically used as a camera flash) on the user's networked device 17 is powerful enough and/or will be consistently pointed toward the light-receiving sensor of the wireless transceiver 9, or if use of such a light source is deemed too much of a drain on the battery for device 17 and/or is inconvenient for any other reason(s).

In the current embodiment, each wireless transceiver 9 broadcasts and receives digital messages, largely independently of each other, establishing wireless connections 18 with networked customers 7 as such customers 7 move throughout the space 30. However, the wireless transceivers 9 preferably are coordinated with each other (e.g., by a local server 12) in order to provide a desired overall user experience (e.g., including seamless handoffs as a networked customer 7 moves from the space covered by one wireless transceiver 9 to that covered by another, such as by using conventional cellular-communications handoff techniques). In any event, as a user device 17 is moved about within the space 30 covered by the wireless transceivers 9, it preferably is capable of communicating with, and automatically establishes connections to, the transceiver(s) 9 having a coverage area 32 within which such user device 17 is located.

As shown in FIG. 3, in some cases the wireless transceivers 9 are sufficiently far apart that their coverage areas 32 do not (or do not significantly) overlap. However, wireless transceivers 9A-D are sufficiently close to each other that there are areas of significant overlap 34 (e.g., overlap areas 34A-C) between their adjacent coverage areas (e.g., coverage areas 32A-D, respectively). In these overlap areas 34, multiplexing (e.g., time-division, frequency-division or code-division), color separation when light-based communications are used, and/or other techniques can be used to distinguish the communications of one wireless transceiver 9 from the communications of another. Also, it often is possible to obtain more precise location information for the networked customer 7 within these overlap areas 34 by comparing signal strength and other communication parameters (e.g., using GPS techniques, relative strengths of the signals, time offsets and/or, using one or more directional antennas or other receivers, origination angle of a received signal) pertaining to the two corresponding wireless transceivers 9.

In the present embodiment, each of the shelves 36 within the space 30 functions as a barrier that limits the coverage areas 32 of the corresponding wireless transceivers 9, which often will be the case, e.g., when the wireless links 18 are light-based and the shelves 36 are sufficiently high. For this purpose, the shelves 36 generally do not need to completely block the signals, but instead just need to sufficiently attenuate them that the user device 17 is highly unlikely to establish a wireless link 18 to a transceiver 9 in a different aisle. Also, it usually is sufficient if shelves 36 act as a sufficient barrier to just one of the two-way links (e.g., just communications from the transceiver 9 to user device 17 or just communications from user device 17 to transceiver 9), so that, for example, if one of such one-way links is light-based, then the shelves 36 typically can function as a barrier. As noted above, this often is desirable because the shelves 36 typically separate different store aisles which, in turn, often carry different categories of products (which may require different expertise).

Figure 4:
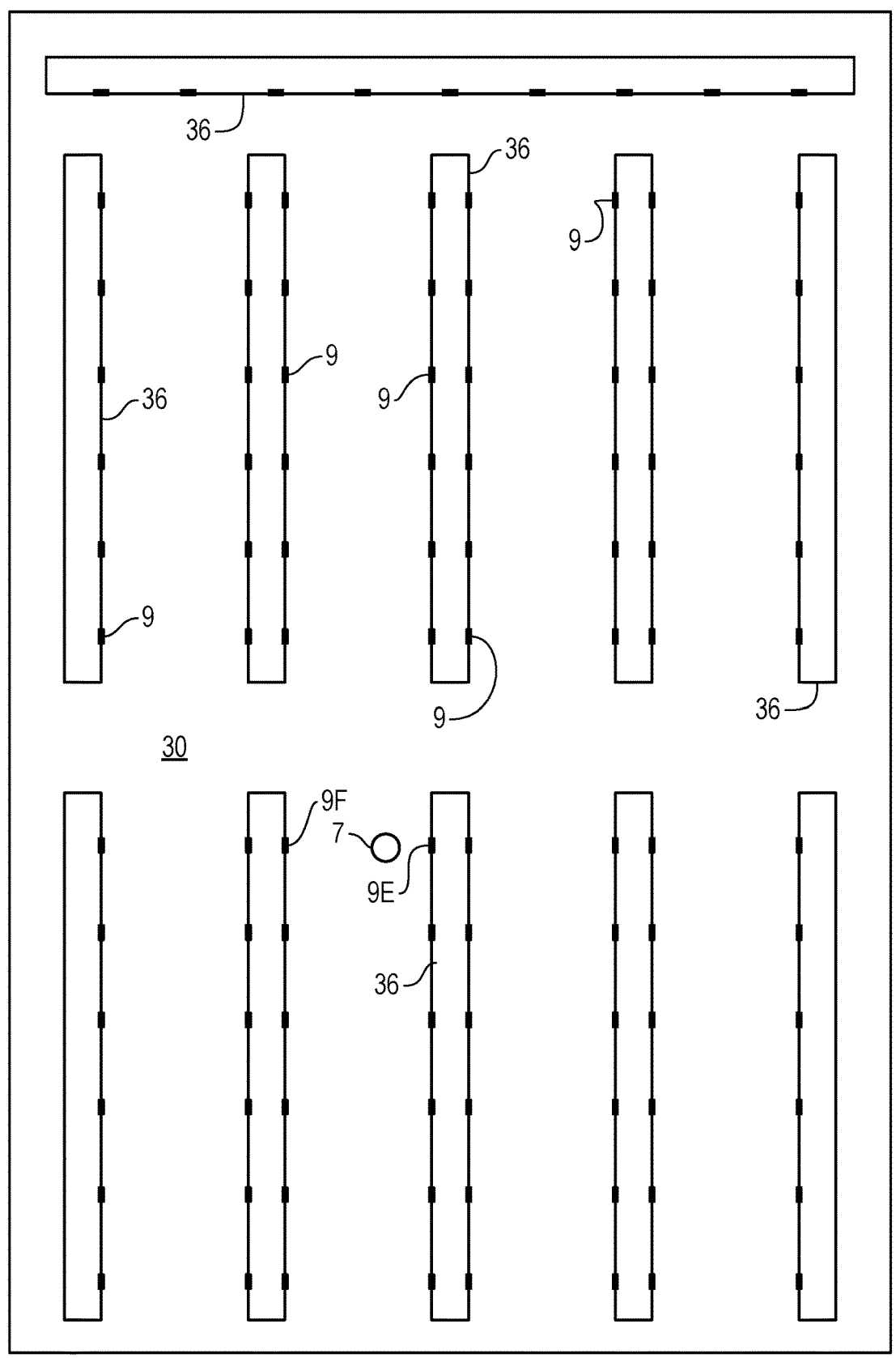
FIG. 4 is a top plan view of a retail space that uses wireless transceivers disposed on (e.g., mounted to) shelves within the space.

Another way to distribute wireless transceivers 9 within the space 30 is shown in FIG. 4. In this embodiment, the wireless transceivers 9 (e.g., transceivers 9E&F) are attached to (or disposed on) the shelves 36. In certain embodiments, the transceivers 9 are placed: (1) at different heights, (2) at heights, such as 3-6 feet above the floor, that are likely to be close to where a particular customer 15 is likely to hold his or her user device 17, and/or (3) very low, such as 0-4 feet above the floor, so as to maximize the barrier effect of the shelves 36). As a result of locating the transceivers 9 on the shelves 36, it often is possible to obtain better spatial discrimination among the various wireless transceivers 9 and/or even to discern the orientation of the networked customer 7 (e.g., whether such customer 7 is closer to and/or facing toward wireless transceiver 9E or 9F), i.e., to obtain a better indication of what specific group of products the customer 7 might be interested in discussing (or otherwise obtaining more information about).

In this regard, in the currently preferred embodiments, wireless transceivers 9 for making available corresponding short-range wireless links 18 to various networked customers 7 within a retail space 30 are disposed throughout such space 30. Although space 30 is illustrated as being just a single floor, or even a portion of a floor, it instead could encompass multiple floors or other sections of an interior space, and/or it could encompass outdoor shopping areas.

The managers or administrators of the retail shopping site of which space 30 is a part preferably cause the wireless transceivers 9 to be placed. In addition, such managers or administrators preferably also initially provide (e.g., upload via a user interface running on a general-purpose computer connected to the site's local server 12) to central server 10, and then periodically update, information for each such transceiver 9. Such information for a single transceiver 9 might include, e.g.: (1) an identification code for such transceiver 9, (2) an identification of the retail shopping site within which such transceiver 9 is located (e.g., with a unique code for each such site), (3) the products available (e.g., by selecting from a set of predesignated categories and/or by providing SKUs or other identifiers for specific products) within the coverage areas 32 of such transceivers 9, and/or (4) any additional information regarding the site (e.g., layout information indicating where products are located, inventory information, etc.).

For the purpose of collecting and uploading such information, e.g., a portable wireless device (such as a wireless phone or tablet), loaded with a special-purpose app may be used by an employee to scan barcodes (or read radio-frequency identification, or RFID, tags) of products within the retail space 30 and simultaneously identify the transceivers 9 with which such portable wireless device is capable of communicating at the time, thereafter uploading such information to central server 10. Beneficially, such a task can be performed at the same time that physical inventory of the contents of site 30 is being taken. That is, by incorporating such functionality into the inventory app, or using separate apps that communicate with each other, the foregoing process can be accomplished without requiring any additional work by the store's employees.

Figure 5:
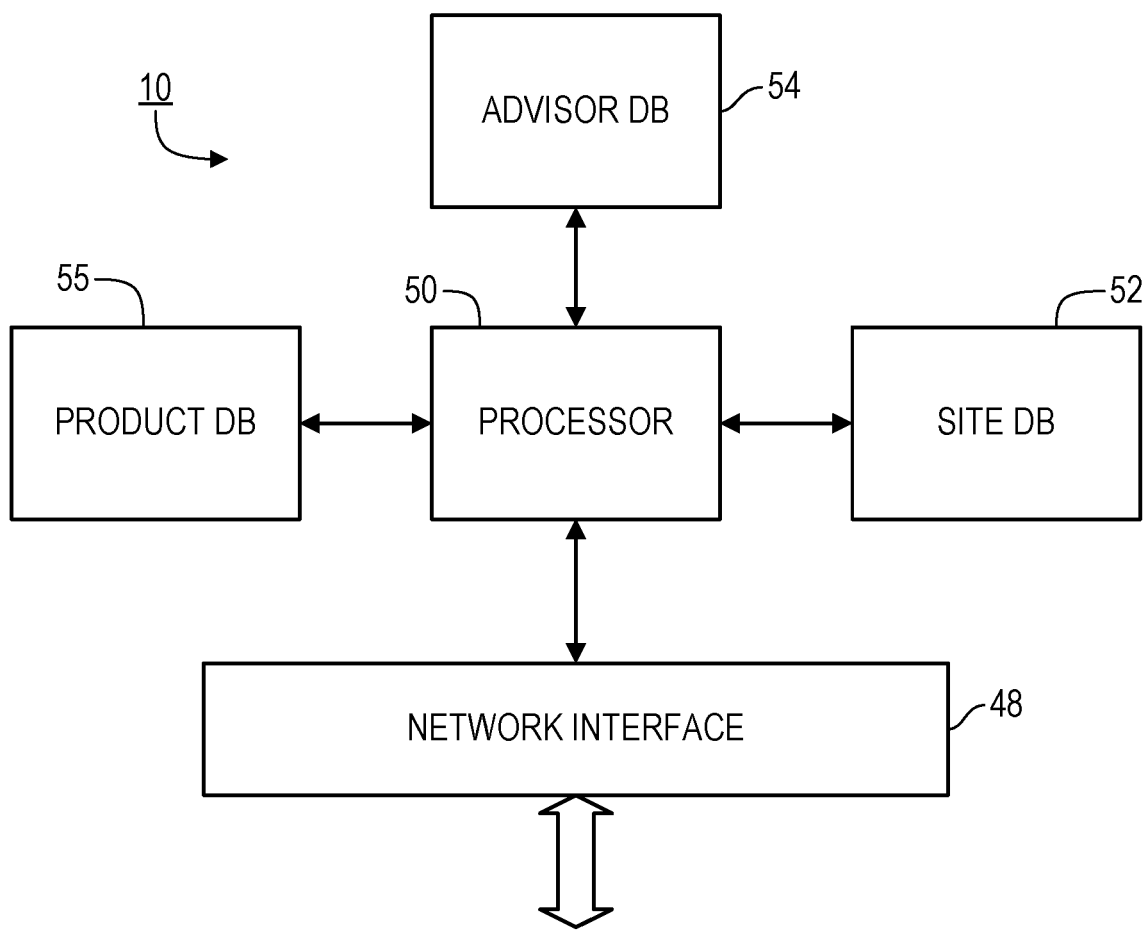
FIG. 5 is a simplified block diagram of a central server according to a representative embodiment of the present invention.

Referring to FIG. 5, following transmission of such site-specific information, central server 10 receives such information, through its network interface 48, into its processor 50, which then stores such information in a site database 52, which includes information about all of the sites server 10 handles, such as information uploaded in accordance with the preceding paragraph. Separately, the administrators of central server 10 preferably have created an advisor (or customer-service representative) database 54 which stores contact and availability information for advisors 8, along with the product categories (e.g., bathroom hardware, baby items or electronics), product types (e.g., faucets, cribs or MP3 players, respectively) and/or individual products (e.g., identified by SKU numbers or other unique identifiers) about which such advisors 8 are deemed qualified to provide advice. For this purpose, a product database 55 preferably also is maintained, listing products by their unique identifiers in association with the types and/or categories to which they belong. References to categories herein can include any number of subcategories extending to any depth that is helpful. In certain embodiments, database 54 also indicates, for each such advisor 8, a rating level that has been assigned to such advisor 8 for each such product, product type and/or product category (e.g., which has been assigned based on demonstrated knowledge of the subject product or category).

In certain embodiments, central server 10 continually transmits/updates information from site database 52 to the devices 14 for the advisors 8 to whom it pertains (e.g., maintaining synchronized information), so that such devices 14 continuously maintain a current database of all the information that the corresponding customer-service representatives 8 might need or want in connection with their customer-service sessions (e.g., pertaining to their area(s) of expertise). In other embodiments, when a new session is started, or when the representative 8 requests particular information, only the applicable information is transmitted at that time (i.e., on an as-needed basis).

With the foregoing infrastructure for system 5 in place, as a networked customer 7 walks through a covered retail space 30 (e.g., as shown in FIG. 3 or 4), he or she preferably automatically connects to individual ones of the wireless transceivers 9 (e.g., the one that currently is closest or currently is providing the strongest signal) and then is able to request a customer-service session through his or her networked device 17. Such wireless connections preferably occur automatically when the networked device 17 is running the appropriate user app, e.g., in a manner similar to that used for connecting wireless telephones to cellular/wireless base stations.

In order to actually request customer service, the app preferably also provides a user interface 70, e.g., including user interface pages 70A-D shown in FIGS. 6 and 10-12. In the present discussion, it is assumed that networked device 17 has a touchscreen. However, no loss of generality is intended, and similar or compatible user interfaces can be implemented on other types of devices.

Figure 6:
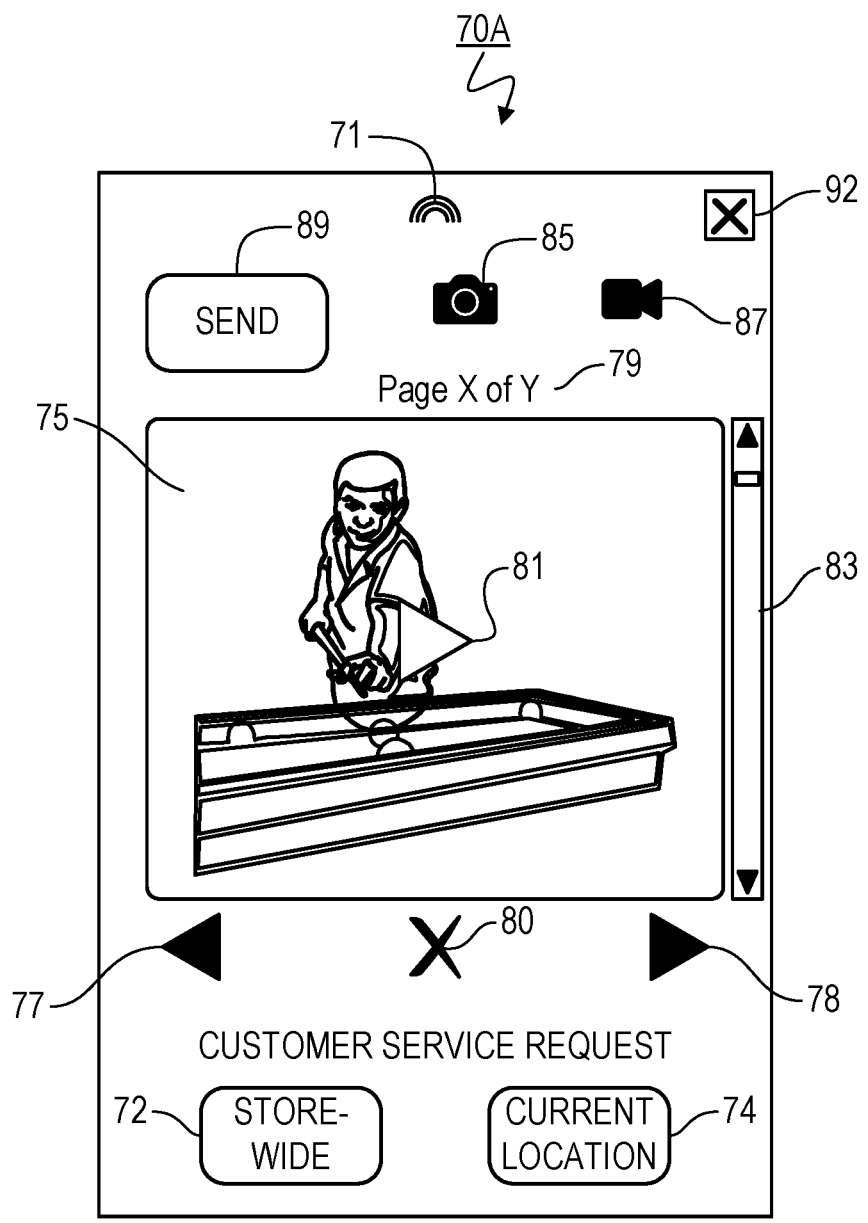
FIG. 6 is an illustration of a composite user interface page for requesting/initiating and then conducting real-time communication sessions.

Referring to FIG. 6, within user interface page 70A is an icon 71 that indicates wireless signal strength (e.g., similar to the indicator of signal strength displayed on a wireless telephone in reference to the strongest available cellular base station). In the present embodiment, if icon 71 shows even a single semicircle, then a connection 18 exists and the user 15 can request customer service by touching either of buttons 72 or 74. Specifically, in the current embodiment button 72 is for requesting general customer service, i.e., not necessarily related to a product in the user's immediate vicinity, and button 74 is for requesting customer service that is more specifically related to a product in the user's immediate vicinity. For example, an individual customer 15 might touch button 72 in order to ask where in the store a particular product (or type of product) is located, and the customer 15 might touch button 74 to ask about the features and/or limitations of a particular product near the customer 15 which he or she currently is considering purchasing and, potentially, about alternate products that might be more suitable for his or her needs.

When either such button 72 or 74 is designated (e.g., touched), a request is sent from device 17 to central server 10 through the transceiver 9 and, potentially, through a local server 12, and then in response, central server 10 establishes a communication link 6 between device 17 and the device(s) 14 of an appropriate customer-service representative 8 (e.g., as described in more detail below). At a minimum, such a link 6 preferably provides two-way real-time audio communications between the customer 15 and the customer-service representative 8, if possible and desired by the customer 15. In addition, user interface 70 preferably allows the two parties to exchange other types of information while the link 6 is active.

For this purpose, user interface page 70A includes a main display area 75 which, in the current embodiment, is used for a variety of different purposes. For instance, upon initiation of the link 6, area 75 might display a real-time video or a still image of the customer-service representative 8 with whom the customer 15 is communicating. Later, the customer-service representative 8 might cause other information to be presented to the customer 15 within area 75. Such information might be, e.g., text-based (e.g., an article reviewing a particular product or a potential alternative product), pre-recorded video (e.g., showing how a product is configured or used), live video (e.g., showing the customer-service representative 8 demonstrating a product), or a still image (e.g., showing any aspect of the product or some result of using the product). Once these individual files have been downloaded to the customer's device 17, in the current embodiment the customer 15 has the ability to switch among them in order to view any of them at any given instant, using arrow buttons 77 and 78 to move backward and forward, respectively, with page indicator 79 denoting the window that currently is being viewed. Also, the customer 15 can choose to delete the file corresponding to the currently displayed window using "delete" button 80.

FIG. 6 illustrates how window 75 might appear after a video (e.g., showing a review of a billiards table that the customer 15 is considering purchasing) has been downloaded to the customer's device 17 and is ready to be played.

Customer 15 simply designates (e.g., touches) the "play" button 81 in order to begin playing the video. Such a video can be entirely fixed in terms of its content, or can be provided with hyperlinks, drill-down features, or any other type or degree of user interactivity and/or control features. In certain embodiments, the playing of the video is synchronized between user's device 17 and the service representative 8's device 14, so that the customer 15 the service representative 8 can continue to communicate with each other about the video as it plays.

Also, in the current embodiment, the customer 15, rather than (or in addition to) conducting an audio session with a customer-service representative 8, might elect to conduct a text-based session (i.e., sending text messages back and forth). In this case, one of the windows displayed in area 75 (which can be reached using buttons 77 and 78) preferably presents the text-based chat between the two parties, with the customer 15 having the ability to scroll up or down, e.g., to review previous portions of the conversation, using scrolling bar 83.

In addition to receiving content from the customer-service representative 8, the customer 15 preferably also has the ability to upload content to the customer-service representative 8. For this purpose, various user-interface elements are provided in the current embodiment. As already noted, the customer 15 might type (or, using speech recognition, dictate) text messages to the customer-service representative 8 using a "chat" window in area 75. Also, in the current embodiment user interface 70 includes a "camera" user-interface element 85 and a "video" user-interface element 87.

In the current embodiment, touching (or otherwise designating) camera button 85 allows the customer 15 to take a photograph (e.g., using device 17's native camera app) and then (e.g., after reviewing it within area 75) to touch "send" button 89 to transmit it to the customer-service representative 8. Alternatively, the customer 15 might instantiate recognition functionality within the app (e.g., where the customer 15 has photographed the barcode for a particular product), view the results (or information pertaining to the results, e.g., a retrieved description of the product and/or image of it) in area 75, and then touch the "send" button 89 to transmit such results to the customer-service representative 8. It is also noted that such functionality also (or instead) can be available to the customer 15 through user interface 70 before initiating the customer-service request (i.e., touching button 72 or 74), with the photograph and/or recognition information sent along with the request, so that the customer-service representative 8 is aware of the product the customer 15 would like to discuss as soon as the customer-service session is begun. Also, or instead, the foregoing recognition functionality can be implemented by the advisor 8's device(s) 14, e.g., upon receiving an image from the user 15's device 17.

Touching (or otherwise designating) video button 87 during a customer-service session preferably by default immediately turns on a camera within the customer's device 17 (e.g., with the customer 15 selecting which camera, if device 17 includes more than one) and begins live streaming video from it to the customer-service representative 8. In certain embodiments when video button 87 is designated, the customer 15 also (or instead) has the option of recording video, reviewing the recorded video (through area 75), and then submitting it to the customer-service representative 8 (e.g., by designating "send" button 89 during a session or, if previously recorded, by requesting submission at the initiation of the session).

In the preferred embodiments, the bidirectional communications can continue for as long as the customer 15 wishes and can include any number and any type of communications, involving different types of media, e.g., as discussed elsewhere herein. As a result of making available multiple different types of communications (e.g., audio, video, still image and/or text), it often is possible to replicate the experience of having a customer-service representative present with the customer 15. When the customer 15 is finished with the session, he or she can simply touch the "exit" button 92. Upon doing so, depending upon the particular embodiment: (1) all of the information previously downloaded to the customer's device 17 automatically is deleted; (2) all such information is saved and archived for later review, if desired; or (3) all or different portions of such information is saved or deleted in accordance with preferences previously set by the customer 15 through user interface 70.

In the preferred embodiments, user interface 70 changes to accommodate different situations, with the depiction of page 70A in FIG. 6 actually showing a composite of features that might only be present at different points in time. For instance, buttons 72 and 74 might be present before a customer-service session has been initiated, but then disappear while one is in progress. Similarly, although FIG. 6 depicts a video ready to be played in area 75, such a video ordinarily would not be present prior to initiating a customer-service session (unless, e.g., the customer 15 has pre-recorded a video to be uploaded upon initiation of the session). Thus, it should be understood that a number of variations from the user-interface depiction illustrated in FIG. 6 are possible.

The foregoing discussion generally is in reference to a single retail site. However, much of the benefit of system 5 arises from the use of system 5 across multiple different (typically geographically dispersed) retail sites. Such different retail sites can be owned or operated by the same entity (e.g., a centrally owned store chain), can be partly controlled by a single entity (e.g., a franchise store chain), can be independently owned (e.g., with the administrators of system 5 essentially functioning as a customer-service outsourcer), or any combination of the foregoing.

Figure 7:
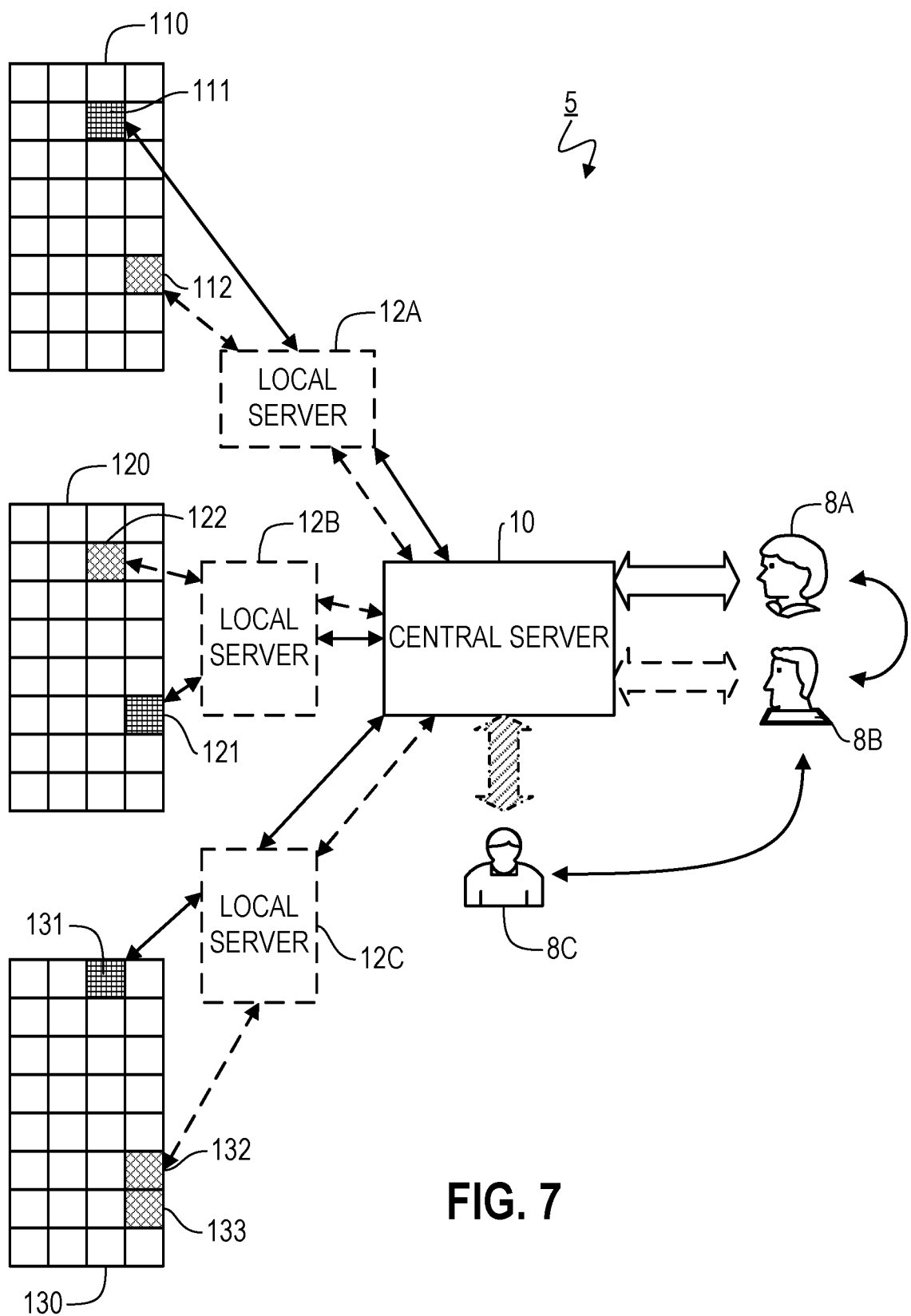
FIG. 7 is a block diagram illustrating how a system according to the present invention can be used to efficiently accommodate multiple different geographically dispersed sites.

The concept of such a multi-site implementation is more clearly illustrated in FIG. 7. Here, three different retail shopping sites 110, 120 and 130 are depicted graphically, although it should be understood that typically there will be many more, such as more than 10, 20, 50 or 100 such sites being handled by a particular system 5. Each smaller block (e.g., each of blocks 111, 112, 121, 122 and 131-133) within each such site 110, 120 or 130 represents a region or an area covered by a different wireless transceiver 9 within that region. Although such regions are shown as being arranged in a rectangular grid in a single rectangular plane corresponding to the respective space 30, such a representation is just for ease of illustration, and in fact such regions often (1) will have more irregular borders (sometimes overlapping) and/or (2) will be on different floors or otherwise separated from each other in any other way.

Typically, different retail shopping sites have a number of different sections or departments, each stocked with items that can be classified under a single common category. Although different types of stores have different emphases and, therefore, different mixes of such sections, often, the sections themselves are similar across different stores (at least stores of the same overall type). For example, all or almost all supermarkets have a fresh produce section, a beverage section, a baked-goods section, etc., while all or almost all superstores have sections such as small hardware items, school and office supplies, consumer electronics, books, greeting cards, small household appliances, men's clothing, women's clothing, toys, men's shoes, women's shoes, etc. Often, even these sections can be divided into even smaller sections. Such divisions of retail space can make it easier for consumers to find what they want. The preferred embodiments of the present invention benefit from such common divisions by assigning different customer-service representatives to handle different sections, but with each handling the same type of section across multiple different retail shopping sites.

For instance, sections 111, 121 and 131, although located in different retail shopping sites 110, 120 and 130, respectively, are stocked with the same or similar types of merchandise (e.g., computer peripherals). Similarly, sections 112, 122, 132 and 133, although located in different retail shopping sites, are stocked with the same or similar types of merchandise (e.g., baby items), but significantly different kinds of merchandise than is located in sections 111, 121 and 131, requiring significantly different kinds of expertise. It is noted that, in this example, retail shopping site 130 has a large baby section, sufficiently large, in fact, that it needs to be covered by two wireless transceivers 9, i.e., resulting in two sections 132 and 133 that are devoted to the same types of items (baby items in this particular example). Although such sections 132 and 133 potentially could contain different subcategories and, therefore, be assigned (by central server 10) to different corresponding customer-service representatives 8, in the present example both are considered to have the same category of product and therefore would be assigned to at least some of the same customer-service representatives 8. More generally, two or more such sections within a particular retail shopping site (usually adjacent to each other) often can be classified together in this manner.

With the wireless transceivers 9 corresponding to the above-referenced sections having been previously identified to central server 10, along with the types of products (and/or specific products) disposed within the section or area covered by each such transceiver 9 (as discussed above), central server 10 is able to appropriately route customer-service requests originating from such sections. For instance, central server 10 preferably: (1) routes all location-specific customer-service requests (e.g., made by touching button 74) that originate from section 111, 121 or 131 to customer-service representative 8A (or someone else who has equivalent expertise in computer peripherals), and (2) routes all location-specific customer-service requests originating from section 112, 122, 132 or 133 to customer-service representative 8B (or someone else who has equivalent expertise in baby items), in either case by establishing an appropriate communication link 6. By routing customer-service requests that appear to relate to similar product types, even though originating from different retail sites, to individual(s) with the appropriate expertise in this way, a single customer-service representative 8 often can be used much more efficiently (e.g., handling queries from a second site when a first site is slow), and customers often can be more likely to reach someone quickly who has the appropriate knowledge to answer their questions or otherwise provide them with helpful advice.

In the preferred embodiments, the customer-service representatives 8 are provided (through their devices 14) not only with the types of items generally carried by the retail shopping site, and particular section therein, from which the current customer-service request originated, but also with detailed information regarding the items currently in stock, e.g., so that such representatives 8 can recommend alternate products available at the same store that might be more suitable to the customer's wants or needs. Such information might be provided by the individual retail shopping sites 110, 120 and 130 (through the central server 10) to such device(s) 14 as simply a list of items in inventory and, potentially, the store's currently available quantity for each item, or may also include graphic or photographic images or other information regarding the layout of that particular retail shopping site's shelves (e.g., within that particular section) so as to enable the customer-service representative 8 to better direct the customer 15 toward finding specific products. When actually directing a customer 15 to the location of a particular product, the customer-service representative 8 can provide spoken directions and/or can download to the customer's device 17 (1) a map to the desired destination and/or (2) turn-by-turn directions (spoken and/or text) to such destination.

On the other hand, if a particular customer 15 has requested general assistance (e.g., by touching button 72), then central server 10 preferably establishes a communications link 6 with a general customer-service representative 8C. For this purpose, representative 8C's device(s) 14 preferably is/are provided with information regarding the entire retail shopping site at which the requesting customer 15 is located, although such information often will be at a higher level of generality, because any specific product questions that might arise during the resulting customer-service session preferably can be subsequently directed to a different representative 8 (e.g., representative 8A) who has expertise with respect to that particular product (e.g., computer peripherals). Instead, as noted above, representative 8C mainly handles more-general questions about the retail shopping center from which the request originated, such as where specific items or types of items are located within the retail shopping site, what the site's hours of operations are, etc. Accordingly, upon initiation of the customer-service session, the device(s) 14 used by representative 8C might display, e.g., general information about the site (such as store hours, etc.) along with a map (e.g., graphic with section labels) showing the layout of the entire retail shopping site at which the requesting customer 15 is located, together with a user interface for performing product (or product-category) queries, e.g., with the results being displayed in textual form and/or as a visual marker on the site layout map. To better assist the customer 15, the device 14 might also display an indication of where the customer 15 currently is located within the site (e.g., by displaying an icon on the site map showing the customer's location or at least the current section in which the customer 15 is located).

As indicated above, system 5 preferably is configured so that each customer-service representative 8 can transfer a current customer-service session to another representative 8 (e.g., in the event it becomes apparent that someone with different expertise might be more appropriate to handle the customer's current question). For example, after directing a customer 15 to where baby bottles are located, customer-service representative 8C might ask the customer 15 whether she needs further assistance with those products and, if so, click on a button (within the user interface on his or her device 14) in order to transfer the customer 15 to an appropriate representative 8. Upon doing so, the corresponding application on device 14 sends a message to central server 10 requesting a transfer to someone with expertise with those products which, in turn, determines that representative 8B currently is available and effects a transfer of the communication link 6 from representative 8C to representative 8B (e.g., a termination of the current link 6 and the initiation of a new link 6B). Then, after assisting the customer 15, representative 8B might similarly request a transfer to someone with general knowledge of the retail shopping site or to someone with expertise in a different product or product type about which the customer 15 has expressed interest. However, in certain embodiments the specialized customer-service representatives (e.g., 8A&B) also handle some or all general inquiries, in order to avoid having to make excessive transfers.

Figure 8:
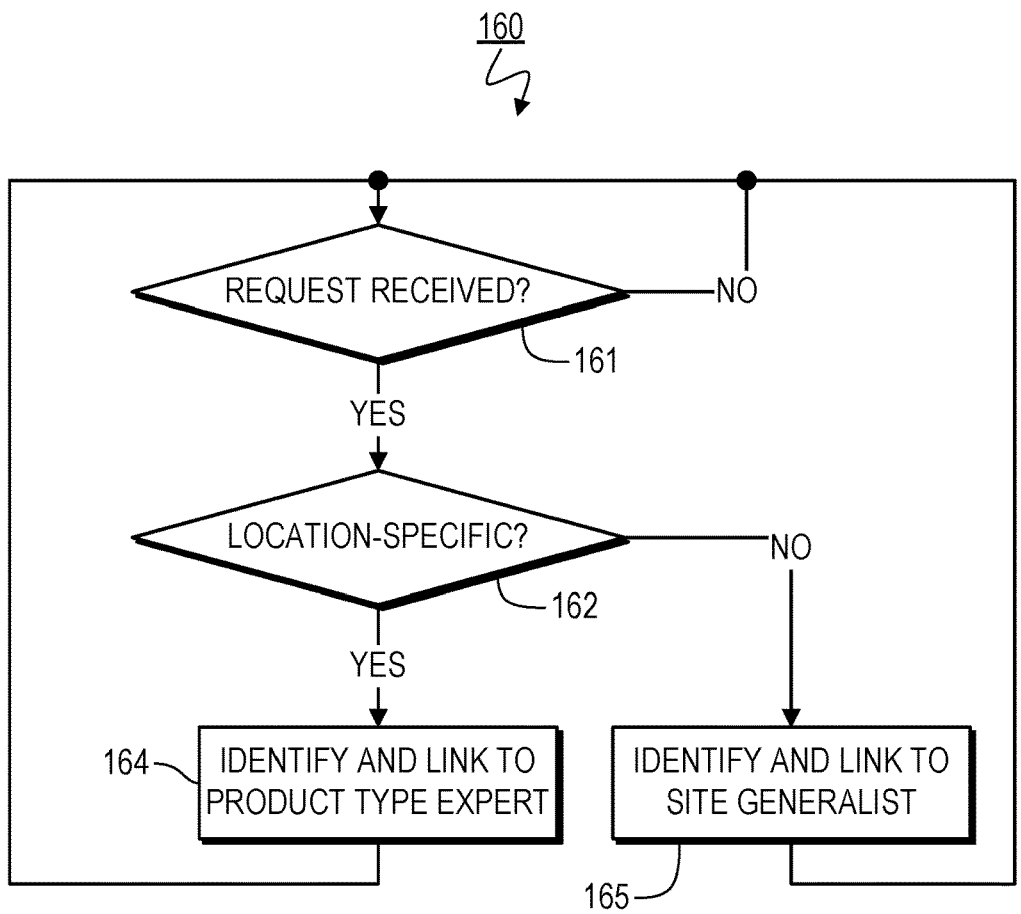
FIG. 8 is a flow diagram illustrating a representative process performed by a central server for handling customer-service requests.

FIG. 8 illustrates a flow diagram of a representative process 160 performed by central server 10 for handling customer-service requests according to the preferred embodiments of the present invention.

Initially, in step 161, central server 10 determines whether a customer-service request has been received (e.g., as indicated by an incoming request message from one of the user devices 17). If not, step 161 continuously repeats until one has been received. At that point, processing proceeds to step 162.

In step 162, a determination is made as to whether the received request is location-specific (e.g., whether button 74 has been touched). In the preferred embodiments, the received request message itself (e.g., as generated by the customer 15's wireless device 17) includes this information. If the request is in fact location-specific, then processing proceeds to step 164. On the other hand, if the request is not location-specific (e.g., button 72 had been touched), then processing proceeds to step 165.

In step 164, central server 10 preferably first identifies an appropriate customer-service representative (or other expert) 8 (as discussed below) and then establishes a communications link 6 between the requesting customer 15 and such expert (e.g., representative 8A or 8B). In the present example, the selected expert 8 has expertise in the product types that are present within the customer's location (i.e., the section or area covered by the wireless transceiver 9 through which the request originated). For the purpose of identifying an appropriate customer-service representative 8, central server 10 preferably receives (in the request message) an identifier for such wireless transceiver 9 and/or a location of such wireless transceiver 9 within the retail shopping site (e.g., appended to the customer's request by the wireless transceiver 9) and then uses that information to index into its site database 52 and advisor database 54 (e.g., based on one of the scoring methodologies discussed below) in order to identify the appropriate customer-service representative 8.

Alternatively, in step 165 central server 10 preferably identifies and then establishes a communications link 6 with a representative (e.g., 8C) who is able to provide general information regarding the overall site from which the request originated (e.g., by referencing site database 52 and advisor database 54, based on a received identifier for such wireless transceiver 9 and/or for the retail shopping site that had been appended to the customer's request by wireless transceiver 9). Typically, a general representative 8C will not need special training because all of the necessary information can be made available to him or her by his or her device(s) 14 (e.g., after receiving it from central server 10). However, in certain embodiments general representatives 8C have expertise in particular sites, are rated on the expertise, and are assigned to customers 15 (by central server 10) based on such ratings.

After completion of step 164 or step 165, as applicable, processing returns to step 161 to wait for another request to be received. As noted elsewhere herein, such a request may be initiated by another customer 15, the same customer 15 or even a customer-service representative 8 who is essentially transferring an existing session (e.g., based on a change in the subject matter that the customer 15 wishes to discuss). When a customer-service representative 8 requests such a transfer through his or her device(s) 14, he or she preferably has the ability to specify a product, product type or product category to which the new inquiry pertains, or else to specify that the new link 6 should be established based on the now-current location of the customer 15 (e.g., based on the wireless transceiver 9 with which customer 15's device 17 currently is communicating).

In the preceding embodiment, a remote advisor (e.g., customer-service representative) 8 communicates with a user (e.g., customer) 15. For the purposes of such communications, the advisor 8 preferably is provided (e.g., by central server 10) with information regarding the overall site at which the customer 15 is located and/or particular products (e.g., within the immediate vicinity of the customer 15) at that site. For more personalized communications, in certain embodiments central server 10 also provides the advisor 8 with additional information pertaining to the location of such site (such as current local events, weather, demographics, or the like) and/or information previously discovered about the specific customer 15 (e.g., regarding the customer 15's interests, occupation, education, home neighborhood demographics, income, gender, age, ethnicity, marital status, number of children, if any, previous purchases, and/or types of stores frequented) which can then be used to assist the advisor 8 in personalizing his or her conversation with the customer 15. Any or all of such information may be provided in raw form or may be pre-processed (e.g., by central server 10) to generate one of a relatively small number of characterizations that can be more quickly and easily understood by the advisor 8 and/or that can be used to automatically provide, or manually retrieve, a script or outline that can be used to guide the advisor 8's discussion. For example, central server 10 might process some or all of such information and then, based on it, generate and provide to the advisor 8 a characterization of the customer 15, e.g., as a likely single, twentysomething beach-city professional female (and/or provide a script based on such a characterization that includes suggestions for the conversation), together with a brief description of the weather and/or one or more current events (e.g., based on interests of the customer 15 alone or an intersection of interests of the customer 15 and the advisor 8) occurring in the customer 15's geographic location (for possible discussion points for the advisor 8 to use during the conversation).

The preceding embodiment contemplates the use of specialized advisors 8 (e.g., customer-service representatives) having different areas of expertise. In order to properly match such advisors 8 to the incoming customer-service requests (e.g., in step 164), several databases preferably are maintained by central server 10, such as site database 52 and advisor database 54 (discussed above). As above, the management of the individual retail shopping sites preferably causes information about their specific sites to be uploaded to server 10, resulting in the creation of site database 52. Advisor database 54, on the other hand, preferably is created by the administrators of server 10) who typically are the creators and/or administrators of system 5).

For this purpose, such system administrators preferably qualify the individual advisors 8 by testing them, and then rating them based on the results, on: individual products, product types, and/or product categories (which can include subcategories and/or can be subcategories of a larger category). For example, such ratings might be made on a scale of 0 (e.g., meaning no verified knowledge whatsoever) to 10

(e.g., meaning the maximum desired level of knowledge and/or competence). Once such individual ratings have been obtained, central server 10 preferably combines them into scores for individual ones of the regions or areas covered by the different wireless transceivers 9 within the different shopping sites, based on the products, product types and/or product categories within such regions or areas.

Such scores preferably are calculated for an individual advisor 8 for each product-type region or area (e.g., 111 or 112), as a combination of the ratings received by such advisor 8 for the products, product types and/or product categories within such region or area. For example, and advisor 8's score for a particular product-type region might be determined as a weighted average of the advisor's ratings with respect to all the products, product types and/or product categories within such region, as indicated by site database 52 (e.g., with product-type and category ratings given weightings that reflect the number of products they encompass and/or the number of products within such region or area that they encompass). In addition, or instead, such scores can incorporate other weightings, such as weighting low scores more heavily (e.g., to account for the increased likelihood that a bad customer-service experience might result if the incoming question happens to concern that particular product, product type or product category).

Alternatively, e.g., for situations in which product-type regions or areas are common across multiple different retail shopping sites (such as might be the case for a chain of stores that use a uniform store configuration), advisors can be tested for and then given a single score based on their knowledge of the products within each such region type. Similarly, advisors (e.g., 8C) can be given site-specific scores which quantify their ability to handle general questions originating from a particular site (which then are used to determine their level of appropriateness when establishing connections in step 165).

The linking of individual transceivers 9 to individual advisors or customer-service representatives 8 preferably is performed using a hierarchical categorization of products (e.g., within product database 55). Ideally, in order to be capable of being assigned to the region covered by a particular transceiver 9, a particular customer-service representative 8 would have to have been assigned at least a minimum competency rating for all products within the coverage area 32 of that transceiver 9. In practice, depending upon how individual retail sites distribute their products, it might not be possible or practical to achieve this goal (at least at all times). Accordingly, server 10 preferably assigns a score to each customer-service representative 8 in reference to each applicable wireless transceiver 9 and then uses such scores for ongoing information transfers (as described above, e.g., limiting the transfer of information to the customer-service representatives 8 who have achieved at least a minimum score with respect to the applicable subject matter), as well as for selecting a particular representative 8 for a particular session request (as discussed above in connection with steps 164 and 165). Such scores can be calculated in a variety of ways, such as: (1) calculating the mathematical mean or median of the ratings assigned to the representative 8 for each product in the transceiver 9's coverage area 32 (e.g., with no rating counted as a 0 and with a highest rating counted as a 10); (2) first modifying such ratings using a desired nonlinear function and then calculating a mathematical mean or median of the modified ratings (e.g., to impose a higher cost on ratings identified as "low" which might leave the customer unsatisfied); or (3) using any other nonlinear function of such ratings (e.g., again, to impose a higher cost on "low" ratings which might leave the customer unsatisfied). One example of the third approach is to simply determine the percentage of the applicable ratings which are below a specified level (which might be referred to as the minimum competency level).

When actually performing step 164 or 165, in certain embodiments central server 10 establishes a communications link 6 between the requesting customer 15 and the currently available advisor who has the highest applicable score (e.g., for the customer's region in step 164 or for the customer's site in step 165). In alternate embodiments, such scores are used in conjunction with other information (e.g., age, gender, language, geographic location, etc.) for the purpose of identifying the particular advisor 8 with whom to link the requesting customer 15. That is, the algorithm employed by central server 10 may take into account other preferences of the customers 15 and/or other factors that might contribute to a positive interaction experience beyond just knowledge of particular items and/or sites.

As noted above, a system (such as system 5) according to the present invention (1) may be implemented in-house by the management of a chain store or (2) may be implemented by a third party that provides services to independent stores and/or to (typically smaller) chains that essentially want to outsource some or all of their customer service. In the latter case, a variety of pricing, payment for compensation mechanisms may be used by the system 5. For instance, system 5 might charge a retailer a flat monthly fee (e.g., based on the number of locations, the size of each such location, expected customer traffic and/or actual previously measured customer traffic). Alternatively, the system 5 might charge based on actual usage of its services (e.g., the number, type and/or duration of customer-service sessions during the preceding month). However, in many preferred embodiments, system 5 receives (as part or all of its compensation) a portion (e.g., a fixed percentage) of the gross revenue and/or profits resulting from sales in which it participated, preferably, less a portion (often a different and/or higher percentage) of any returns from such sales. As a result of such a compensation arrangement, the interests of the individual retailers and system 5 (functioning as an outside service provider) will be more closely aligned, i.e., increased sales and/or decreased returns. On the other hand, fee arrangements that do not provide such incentives might be seen as more objective and, therefore, more preferable to the customers 15.

Further Embodiments

The foregoing discussion concerns one particular example within which a system 5 may be used—for customer service in connection with retail shopping. However, it should be readily apparent that system 5 can also be used in a wide variety of other environments. For instance, a similar or identical implementation can be used to provide person-to-person interactions for communicating information in: restaurants (e.g., where customers have questions about particular items on the menu), libraries, museums (e.g., in which an area or a region 32 covered by an individual wireless transceiver 9 encompasses exhibits according to a common theme, so that docents with specialized knowledge can provide information to people at geographically dispersed museums), other tourist attractions, or any other locations (e.g., commercial, educational or recreational) where it is desirable to make available people having specialized knowledge.

More generally, a system (such as system 5) according to the present invention can be used in any context in which different individuals sometimes would like access to expertise. Other examples include manufacturing, warehouse operations, other employment environments and military environments. In each case, using a system according to the present invention, an individual (e.g., a worker, professional or soldier), in the course of performing his or her duties, can have quick access to experts to answer questions that arise. Sometimes, as in the retail embodiment, location of the individual will be a key factor, and within an indoor or relatively limited space, location can be determined, e.g., in any of the ways described above. Otherwise, location can be determined using a Global Positioning System (GPS) receiver on the device 17 of the particular individual 15 and then transmitted to the central server 10 for use in identifying an appropriate expert 8 (e.g., in conjunction with other information, such as known locations of other people or things). In other situations, other contextual information that is likely to be relevant to the query (e.g., depending upon the embodiment, weather conditions, video and/or audio from the device 17's camera or microphone, etc.) can be automatically gathered by the device 17 and/or directly input by the user 15 and then transmitted to central server 10 to be used in identifying the appropriate expert 8.

In the foregoing embodiment, a user 15 is presumed to be within the area 32 covered by the wireless transceiver 9 with which his or her wireless device 17 is communicating at that particular time. That is, in the foregoing embodiment the wireless transceivers 9 are used both for communications and for roughly identifying the user's location. In alternate embodiments, the wireless transceivers 9 are used (if at all) only (or mainly) for communications, and a different technology is used for identifying the user's location (either alone or in combination with the foregoing methodology using wireless transceivers 9). Such other location-identifying technologies can include, e.g., satellite-based GPS, indoor GPS, visual recognition of input from the user 15's device 17's camera, either with or without special-purpose markings within the covered space 30 which can be detected and used to establish the user 15's location, and/or scanning RFID tags within the vicinity and comparing the results to information for product layout within the particular site. Also, when RFID scanning (or equivalent technology, such as visual identification of nearby products using optical recognition techniques) is used, it often will be unnecessary to actually determine a location. Instead, the list of identified items (e.g., store products) can be used directly by server 10 in order to identify an expert, advisor or service representative to assist the customer 15.

Also, in the preceding embodiment, the central server 10 establishes communication links 6 between individual users 15 and advisors 8. In certain embodiments of the invention, however, instead of (or in addition to) such communication links 6, central server 10, local server(s) 12 and/or other components of a system 5 according to the present invention provide automated assistance to the users 15 through their devices 17. Such automated assistance might include, e.g.: (1) additional information (e.g., text, photograph(s) and/or video(s)) downloaded to the user device 17 when the user device captures and uploads information identifying a particular product (e.g., the product barcode or an image of the product itself), with the central server 10 or other device within system 5 pre-storing such information in association with the different products or retrieving such information pursuant to a Web search (e.g., text-based or image-based); (2) an automated interactive link, pursuant to which the customer 15 can submit questions (e.g., in text or audio form) to which the corresponding device (e.g., central server 10) searches for, retrieves and presents relevant information (e.g., in the form of text, photograph(s), video(s) and/or a synthesized verbal response); and/or (3) a virtual reality presentation (e.g., in which a camera on the user device 17 or on a separate or attached virtual-reality headset uploads video) and the corresponding device (e.g., central server 10) in system 5 supplements such video with relevant information corresponding to what the camera is looking at and downloads it back to device 17 or such headset in real time).

In the case of a virtual-reality-based system (as mentioned in the preceding paragraph), various existing technologies, such as image recognition, barcode readers and/or optical character recognition (OCR) can be used to interpret information captured by the user's camera (e.g., on the user's device 17 or on the user's virtual-reality headset). Such interpreted information can then be used (e.g., by central server 10, in conjunction with the identified location of the user within a particular site, together with stored information regarding that location) to obtain a clear understanding of what such camera is displaying. Then, central server 10 preferably supplements such image with additional information (e.g., text, images, hyperlinks and/or voice-over audio), either stored locally by server 10 or retrieved on-the-fly by server 10 over the Internet.

Rather than connecting a requesting user 15 to a live advisor 8, in certain embodiments of the invention central server 10 also (or instead) functions as, or connects users 15 to a different server which functions as, an expert (artificially intelligent) system for providing information regarding products and/or product categories. That is, in such an embodiment, the individual users 15 have access (through their devices 17) to a virtual helper that can provide information and/or connect the user 15 to a live expert advisor 8, to an appropriate community of other users 15, or to any of the other resources mentioned herein, at the request of the user 15.

In the foregoing embodiments, a user 15 communicates through the system 5 using a handheld wirelessly networked device 17. However, it should be understood that other types of devices may be used by a customer 15 for communicating within system 5, and any references herein to devices 17 should also be understood as referring to such other types of devices. For instance, a store (or other type of site) might decide to install networked communication devices (either hardwired or wireless) at various fixed locations throughout the site (e.g., for users who do not have mobile devices 17, have not yet downloaded the app, or otherwise do not wish to use their own devices for this purpose). Such site-specific communication devices can incorporate the functionality of both the customers' mobile devices 17 and the wireless transceivers 9.

In addition, or instead, in certain embodiments a site provides site-specific mobile (e.g., robotic) communication devices that are available to its users (e.g., customers). For example, a variety of different virtual presence robotic devices (typically employing a motorized base and a tablet computer for a user interface, such as MantaroBot TeleMe™ TelePresence Robot or Double Robotics' Double Telepresence Robot™) currently are available and can be used for this purpose. In the preferred embodiments, such robotic devices are provided (e.g., supplemented, in the case of certain existing robots) with a variety of sensors (e.g., camera, infrared, laser) and navigation programming for automatically navigating through the desired space (e.g., the entire retail shopping site). In certain preferred embodiments, such robotic devices are configured to automatically move into the vicinity of individual customers, remain there for a period of time, wait for shoppers to request assistance, and then (if no requests have been made) move into the vicinity of other (different) individuals and repeat the process. Even more preferably, such robotic devices (1) communicate with each other and/or (2) are configured to cover different defined spaces within the overall site, in order to keep them adequately dispersed throughout the entire shopping site, but still near customers who might need them. Such robotic devices can incorporate the functionality of the customers' mobile devices 17 and/or even some of the functionality provided by central server 10 (e.g., for providing fully automated assistance, by storing the relevant information internally).

Figure 9:
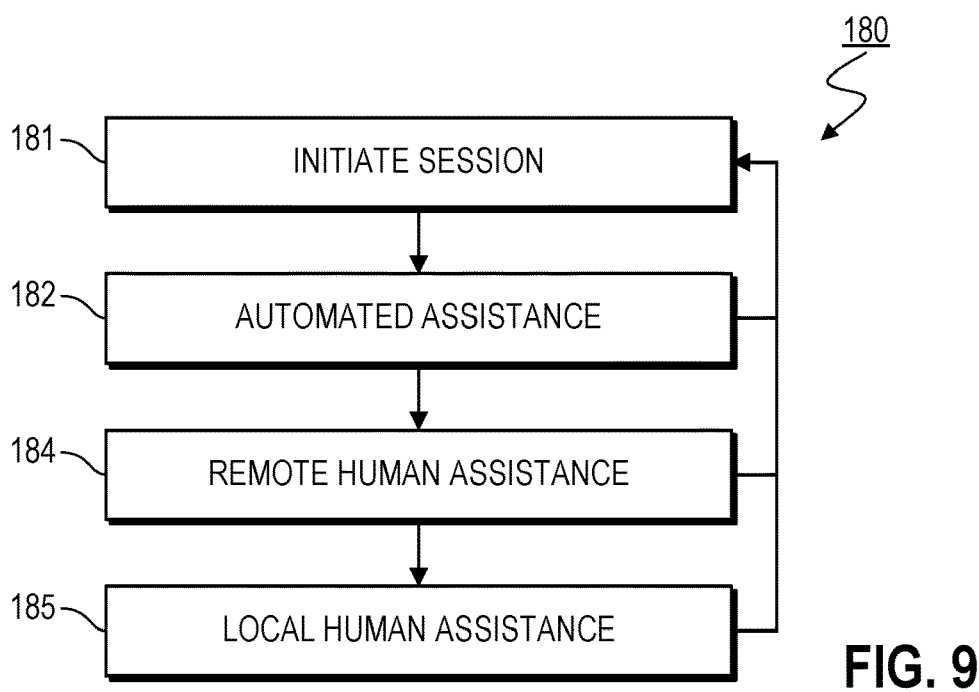
FIG. 9 is a flow diagram illustrating a representative top-level process for handling a customer-service request.
Figure 10:
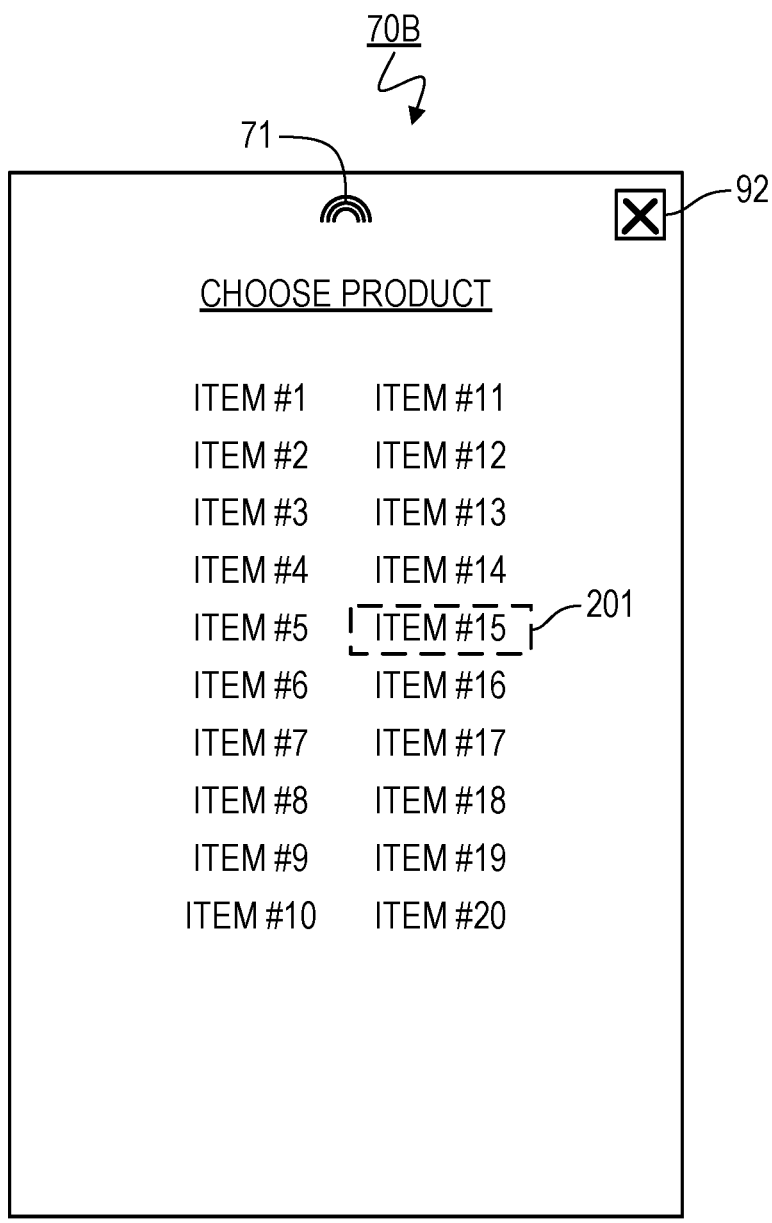
FIG. 10 is an illustration of a user interface page for selecting a specific product to be discussed during an interaction with a customer-service representative, from a displayed list of potential products within a user's vicinity.
Figure 11:
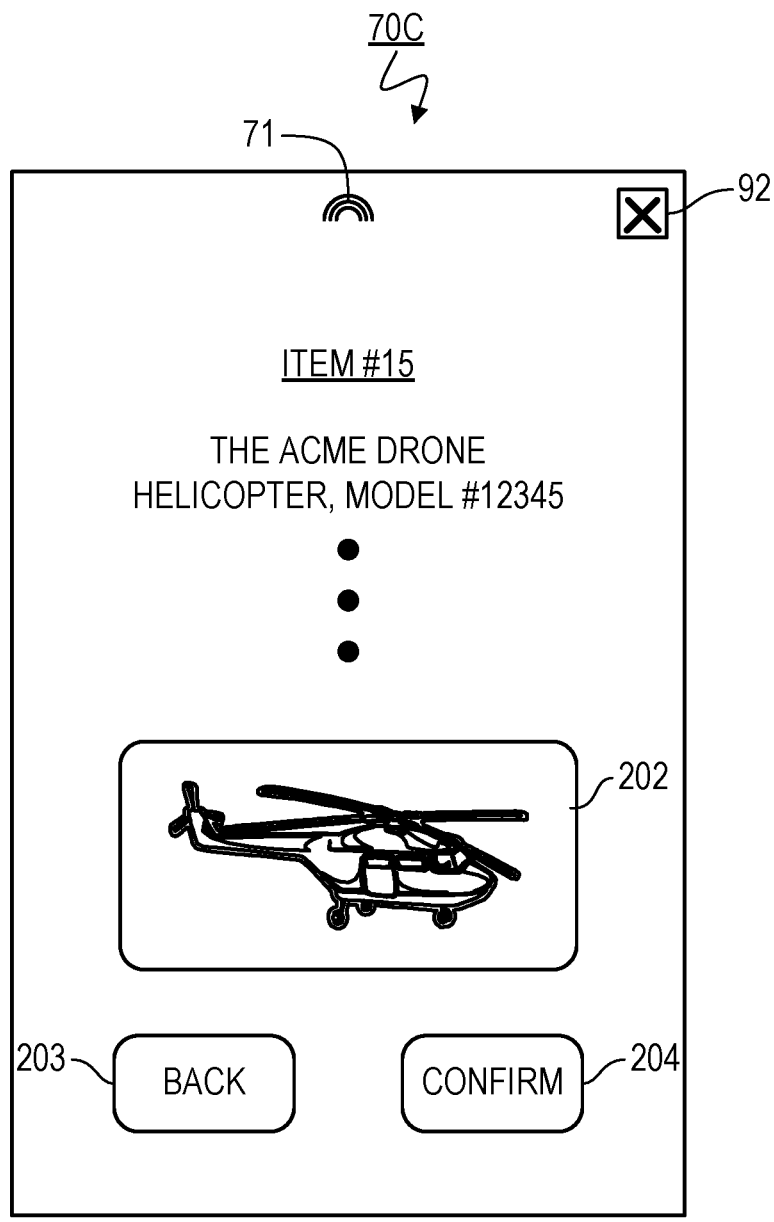
FIG. 11 is an illustration of a user interface page that provides additional detail regarding a selected specific product and allows the user to confirm the selected product.

More generally, a system 5 according to certain embodiments of the present invention often can accommodate (and in fact utilizes) multiple different types of user (e.g., customer) 15 interactions. One example illustrating how such an interaction can be flexibly handled by a system 5 is process 180 illustrated in FIG. 9.

Initially, in step 181 a user interaction is initiated. In keeping with the preceding example, the following discussion assumes that the user 15 is a customer seeking assistance in connection with a shopping experience. However, no loss of generality is intended.

Immediately, in step 182, automated assistance is provided to the user 15. Such automated-assistance functionality can be provided by a local device (e.g., handheld wirelessly networked device 17 or a site-specific device, such as a fixed or mobile device, as described above) and/or by the central server 10. Examples of the types of automated assistance that can be provided in this step 182 are discussed above and, therefore, not repeated here. Advantages of using automated service include: a reduction in labor costs and an ability to provide immediate service, even if live representatives cannot be immediately identified and/or contacted. In many cases, questions can be handled in this step 182. However, if it becomes apparent to the device(s) handling the request (e.g., based on a pre-specified criterion) that resolution of the request is not possible, or is not possible within a specified acceptable timeframe, then processing proceeds to step 184.

In step 184, central server 10 establishes a link 6 between the customer 15 and a human representative 8, e.g., as discussed in significant detail above. In the preferred embodiments, the representative 8 also has access to the automated assistance resources referenced in connection with the discussion of step 181 above (e.g., together with a description of the automated assistance that has been provided so far), so the present step 182 can be seen as being cumulative to step 181. Although the discussion above mainly focuses on a link 6 between these two individuals, in the current embodiments that paradigm is just the starting point of this step 184. In some circumstances, it might become apparent to the representative 8 that additional assistance is needed, in which case the representative 8 might cause one or more additional individuals (e.g., with additional expertise) to be brought into the communication link 6. For example, a three-way communication link 6 might at that point be established, with the third person being another advisor 8 who has more expertise in relation to a particular question that has been posed, a local in-store person, a representative of the manufacturer of a subject product, the current representative 8's supervisor, etc. Alternatively, or in addition, in the event that the link 6 has been established using a robotic device at the customer 15's side (e.g., as discussed above), the representative 8 might instruct the robotic device to perform some task(s) locally (such as guiding the customer 15 to a different location in the store and/or retrieving one or more items off of a shelf for the customer). If the foregoing tools still are not sufficient to appropriately address the customer 15's needs, then the representative 8 preferably has the ability to transfer control of the session to an individual at the same site as customer 15 (e.g., by notifying someone at such site that the customer 15 needs assistance and providing that individual with the customer's location within the site), thereby advancing processing to step 185.

In step 185, an in-store (or otherwise on-site) individual begins interacting with the customer 15. In the preferred embodiments, such an individual uses a networked device (e.g., a wireless handheld device) that enables him or her to remain in contact with the representative 8 and thereby maintain access to all of the resources discussed previously. In other words, this step 185 preferably can be seen as additionally cumulative to step 184 (discussed above). Step 185 can be beneficial when local tasks need to be performed (e.g., that are not capable of being performed by a robotic device on-site, or where no such robotic devices exist) and/or when local personnel have access to information that has not yet been provided to central server 10. However, when it is determined that such information exists, it preferably is provided to central server 10 (e.g., by such on-site individual or by the representative 8) for use in future customer interactions. That is, in the preferred embodiments the knowledge available within system 5 (e.g., stored by central server 10) increases over time as new customer interactions occur, meaning that more and more interactions can be handled in step 182 or 184.

At any point in the process 180 after the customer 15's needs have been addressed, processing returns to step 181 to begin a new session with a different customer 15. Of course, instantiation of process 180 can be seen as just one thread. Typically, central server 10 (or, more generally, system 5) will be capable of handling many (e.g., hundreds or thousands of) customer-service requests simultaneously.

Also, in addition to providing information, in the context of a commercial operation, system 5 preferably can be used to complete sales transactions. For example, at any of steps 182, 184 or 185, if a customer 15 decides to purchase a particular product, that transaction (potentially along with the purchase of any other products that the customer 15 wishes to purchase) is completed, e.g., with the applicable device accepting electronic payment from the customer 15 and then, e.g., if a site-specific device, printing a physical receipt and/or with an electronic receipt being downloaded to the customer 15's wirelessly networked device 17.

In certain embodiments discussed above, the user's device 17 is configured to scan for and detect RFID tags within its vicinity. As noted previously, the list of identified products can be used to assist server 10 in selecting an appropriate customer service representative (or advisor) 8. In certain embodiments, e.g., where specificity is desired, the user interface 70 of device 17 displays a list of the items identified, e.g., as shown by user interface page 70B in FIG. 10 (e.g., after transmitting the retrieved codes to the local server 12 or the central server 10, which then returns corresponding short product names and/or descriptors), and allows the user 15 to select (or designate) the one 201 about which he or she would like additional information. Upon doing so, the user interface 70 preferably displays a more detailed description of the product (e.g., also downloaded from local server 12 or central server 10 in response to the message from user device 17 that includes the selection), as well as one or more photographs 202 of it, e.g., as user interface page 70C shown in FIG. 11. If this is not in fact the product that the user 15 intended, then the user 15 designates the "Back" button 203 and, in response, the user interface 70 returns to the list shown in FIG. 10. On the other hand, if it is the correct product, then the user 15 designates the "Confirm" button 204 and, in response, the device 17 preferably communicates the product confirmation to the central server 10. Because central server 10 now has a specific product identifier, a customer service representative 8 having specific expertise in that product can be selected (e.g., in any of the ways described herein).

The preceding embodiments mainly concern an approach in which the user (e.g., customer) 15 is matched up with a customer support representative 8 who has been selected solely by the central server 10 according to a predefined matching process. However, system 5 also can be configured to allow the individual user 15 to choose what type of assistance and/or other type of information he or she would like to receive. For instance, upon designating the "Confirm" button 204, in one of such embodiments, the user interface 70 displays a user interface page 70D (shown in FIG. 12) that includes a list of assistance options 211-215 from which the user 15 can select. That is, upon selecting one of the interface elements 211-215, e.g., a corresponding message is sent by the user's device 17 to the central server 10, which then connects the user 15 to a corresponding different type of resource.

For instance, designating interface element 211 causes the app running on the user's device 17 to transmit a message to the central server 10 requesting an interactive session with a representative of the site (e.g., store) at which the user 15 is located. In response, central server 10 identifies an appropriate site representative, e.g., in the same manner as discussed above, but limited to someone who is directly employed by, or otherwise under the control of, the entity that owns, controls or franchises out such site.

Designating interface element 212 causes the app running on the user's device 17 to transmit a message to the central server 10 requesting an interactive session with a representative of the manufacturer of the product previously selected by the user 15 (e.g., by selecting the "Confirm" user-interface element 204). In response, central server 10 identifies an appropriate manufacturer representative, e.g., in the same manner as discussed above, but limited to someone who is directly employed by, or otherwise under the control of, the manufacturer of such product.

Designating interface element 213 causes the app running on the user's device 17 to transmit a message to the central server 10 requesting an interactive session with a consumer advisor (e.g., an expert who is not affiliated with the site, the particular product identified by the user 15 or any similar product, but instead holds himself or herself out as being unbiased, such as a person or entity that evaluates, compares and reports on products). In response, central server 10 identifies an appropriate advisor, e.g., in the same manner as discussed above, but limited to this type of neutral advisor. In the present embodiment, the central server 10 selects from all the available neutral advisors in an attempt to identify the best fit. However, in alternate embodiments, multiple such consumer advisor user interface elements 213 are provided through user interface 70, e.g., each associated with a different evaluation entity (such as a magazine devoted to a particular category of products that also does product reviews or a consumer advocacy organization that reviews products). In such embodiments, the individual user interface elements 213 selected (e.g., by central server 10) to be displayed on user interface 70 at any given time are the ones most likely to be relevant based on the product or product category selection made by the user 15 (e.g., by comparing such user selection to product-review information previously submitted by each potential organization): then, the central server 10 preferably selects an individual within the organization designated by the user 15 in the same manner discussed above (e.g., selecting an individual within the organization having the most expertise pertaining to the identified product and/or the type of information being sought about that product).

The preceding examples of assistance options (i.e., options 211-213) are similar to the first embodiment discussed above, in which the central server 10 initiates an interactive session between the user 15 and an expert advisor 8, except that in the preceding examples, the user 15 has some discretion as to the type of advisor 8 with which he or she will communicate. For example, a manufacturer's representative might be desirable in cases where the user 15 wants to know very specific information about the product, while a consumer advisor might be preferable for unbiased information about whether that particular product is appropriate to the needs of the user 15 and/or whether another competing product would better suit the user 15's needs.

Figure 12:
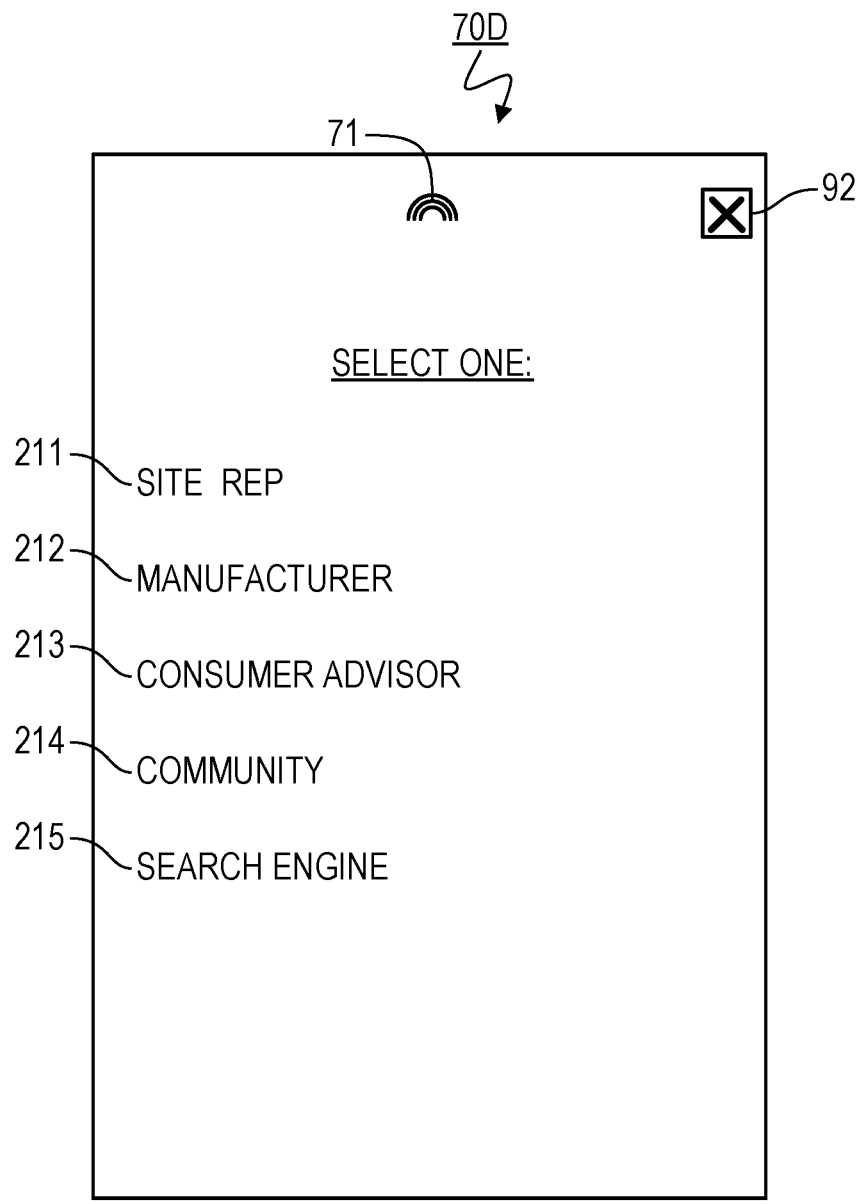
FIG. 12 is an illustration of a user interface page for selecting a desired type of assistance, from a displayed list of potential types.

User-interface element 214 allows the user 15 to obtain a different type of input regarding the product. Upon selecting it, the central server 10 puts the user 15 in touch with one or more (e.g., all) members of a community of other individuals (not necessarily experts), such as other people who are considering purchasing, or who have already purchased, the same product or a competing product. In one implementation of this feature, the central server 10 stores predefined lists of product categories (e.g., in a hierarchical arrangement), together with a list of products in each category (or each bottom-level category). Then, upon receiving a request in response to the designation of user-interface element 214, central server 10 identifies the lowest-level category having a sufficient number of user(s) 15 (e.g., meeting or exceeding a specified threshold) currently involved in (or otherwise seeking) a conversation and then includes the present user 15 in that conversation. In some embodiments, central server 10 also (or instead) contacts other pre-identified individual(s) who are believed to have knowledge about the product category (e.g., registered individuals who have previously purchased that identical product or a competing product within the same identified category), contacts them to see if they are available for a communication session, and then includes them within such a session if they agree to it. In any event, once such a session is initiated, user interface 70 preferably displays a list of participants and allows the user 15 to disengage from communicating with individual participants (such as by designating a "Disconnect" user-interface element next to their identifiers), e.g., if the user 15 determines that they do not appear to be helpful in the user 15's decision-making process. Also, as people are "dropped" in this manner, the user 15 preferably can select another user interface element on user interface 70 for requesting additional participants. Upon designation of that user-interface element, the user's device 17 generates and sends a request message, and upon receipt, central server 10 attempts to contact any additional individuals were believed to have knowledge about the subject product category, e.g., in the manner described above. In this way, the user 15 can communicate with different individuals, having different experiences. Also, although only a single user interface element 214 is shown in FIG. 12 and discussed above, in alternate embodiments multiple such user interface elements 214 are provided, with each accessing a different community of users.

Finally, upon designation of user-interface element 215, the user's device 17 automatically generates and sends a request message regarding the identified product to a search engine (either without further input by the user 15 or after allowing the user 15 to provide additional details about the type of information that is being sought), preferably hosted by central server 10. In response, central server 10 retrieves and returns corresponding information regarding the product (e.g., articles, blogs and/or pre-stored product data, such as user manuals, specifications, infomercials, and potentially with the apparently relevant portions highlighted) and, in some cases (e.g., if requested by the user 15), similar information regarding competing products. That is, unlike most of the previous options which result in an interactive session (with one or more individuals or with an automated system), the present option provides information to the user 15 more in the manner of a conventional Web search (e.g., with links to other pages embedded in the information returned). However, in the preferred embodiments (in which the search engine is run by central server 10), the search results can be made more relevant to the user's current experience (e.g., providing information mainly about products carried by the site at which the user 15 currently is located or otherwise available through that site, as discussed in greater detail below). Once again, although only a single user interface element 215 is illustrated in FIG. 12, in alternate embodiments multiple such user-interface elements 215 are provided and the user 15 has a choice of different search engines to use.

In the foregoing discussion, the user 15 identifies a particular product after being presented with a list of products within his or her the vicinity that was generated from an RFID scan. In alternate embodiments, the user interface 70 allows the user 15 to identify a particular product in any of a variety of different ways, such as by using his or her device 17 to photograph and then recognize the barcode on a product or by using such device 17 to photograph the product or its packaging and then identify the product using available image recognition techniques. In the latter case, because the site's inventory is known in advance, recognition can be made more accurate by comparing the image information to a more limited database of potential matches.

As will be readily appreciated, a system (such as system 5) according to the present invention generates a great deal of additional information that typically is not conventionally available. For instance, based on the customer location information, such a system can generate information regarding the paths taken by individual users (e.g., customers) within a site and/or regarding aggregate customer traffic data at the site. This path and/or traffic information can then be used, e.g., for more-effective product placement, for directing the locations of the robotic devices discussed above, and/or for enhancing cross-selling opportunities.

In certain embodiments a system 5 according to the present invention maintains an electronic record of each interaction between a user (e.g., customer) 15 and an advisor (e.g., customer-service representative) 8, which is stored in its original format (e.g., audio) and/or in a processed form (e.g., using a speech-recognition algorithm to convert audio into text for easier searching and other uses). Such information can, e.g., help manufacturers and wholesalers to better understand their potential customers and what needs, desires, questions and concerns potential customers might have in relation to their products which, e.g., in turn, can assist in better marketing and communications, generally, as well as helping to inform design decisions pertaining to future product models.

For example, in the retail setting, such information: (1) is qualitatively new because information is being generated at the point of decision-making and quantitatively much larger than what previously has been available to retailers, distributors, manufacturers, etc.; and (2) can be used to guide a manufacturer's product development (e.g., by providing greater insights as to what customers are looking for), to guide retail and manufacturer marketing (for similar reasons), and/or to guide retail inventory decisions (e.g., by facilitating predictions of future demand). Accordingly, such user interaction information (regardless of the environment in which a system according to the present invention is used) preferably is stored in a database within central server 10 (e.g., the raw data, such as audio recordings of conversations, and/or after processing, such as speech recognition, indexing, etc.), along with relevant circumstantial data (such as the date and time of the interaction, the site at which the user 15 is located, the specific location of the user 15 within that site during the interaction, personal characteristics of the user 15, etc.). Such information subsequently can be mined, e.g., using existing techniques in order to facilitate the making of a variety of different decisions. In the preferred embodiments of the retail context, the interaction information is linked with information about whether the customer 15 ultimately decided to purchase the original product about which the query originated, or another competing product, and then such information subsequently is mined to determine, e.g., what factors are statistically most relevant in various kinds of purchasing decision.

In the foregoing embodiments, the central server 10 controls and, in some cases, monitors the communications of individual users 15 through the system 5. As a result, a large database of useful information can be generated in the process. Similarly, a local server 12 (when used) also (or instead) can be used to monitor such communications, thereby providing similar information and capabilities to the owners or operators of the site from which such users 15 are communicating.

As indicated above, in certain cases product manufacturers and/or wholesalers make available personnel to serve as customer-service representatives 8, thereby providing them with the ability to have direct contact with their end customers, which would be very difficult or impossible to achieve one selling through conventional brick-and-mortar operations. That is, in reference to suppliers, a system 5 according to the present invention often can provide the best aspects of both online and brick-and-mortar sales, e.g., allowing customers to physically touch and see products they are considering purchasing, while also allowing the ultimate providers of those products with the ability either (1) to directly interact with customers who need assistance or (2) at least to subsequently review electronic records pertaining to those interactions.

A system according to the present invention can be configured to provide to the users 15 (e.g., customers) any degree of desired granularity, in terms of the expertise of the advisor 8 that is assigned to any particular user 15. For instance, an advisor 8 who has special expertise in the particular product (or other item) at issue might be assigned. Alternatively, an advisor 8 who has good expertise in a category that includes that particular item (but not necessarily special expertise with respect to the particular item) might be assigned. Moreover, depending on the particular embodiment, this decision is (1) made at the system level, (2) with input from the user 15 (e.g., depending upon whether the user 15 wants specific advice regarding a particular item or more general advice regarding that item and other similar or related items), or (3) any combination of the two.

Thus, a system according to the present invention provides benefits both to individual users (e.g., customers) 15 and to the entities that operate retail shopping sites and other types of facilities. Within the retail context, customers 15 can be provided with significantly greater resources than are possible when conventionally shopping within brick-and-mortar stores. Not only is it possible to obtain a larger amount of information using a system according to the present invention, but in certain embodiments of the invention customers 15 have the ability to electronically purchase items that are not even carried by the particular store in which they currently are located (e.g., for later delivery to their homes, or for subsequent pickup in the same store or a different one). In this regard, retailers using a system according to the present invention can begin to think of their physical sites more as showrooms (e.g., with limited inventory) for customers to physically inspect products before purchasing them. With the added flexibility that is possible with such a system, some of their customers (e.g., after communicating with customers in other stores, as discussed above) ultimately might decide to purchase another product that the store in which they currently are located does not carry. By using a system according to the present invention and establishing relationships with online retailers, or maintaining warehouses with a greater variety of products, the operator of a physical retail shopping site can be more likely to ensure that their customers have many more options to purchase and, therefore, sales are not lost. At the same time, the owners of the physical site can profit from such additional transactions. For example, through an agreement with an online retailer, the owner of a physical retail shopping site can obtain a sales commission for any products purchased by its in-store customers through the system 5 from such third-party vendor. Also, a system according to the present invention can provide other sources of revenue, efficiencies and cost savings. For instance, using information from previous customer interactions through the system 5, the brick-and-mortar store can continuously adjust its product inventory in an attempt to better provide the specific products that its customers wish to purchase.

In other words, rather than performing its traditional role, a system 5 according to the present invention can help retailers to transition to more of a gatekeeper role, in which some physical items are carried on hand (in some cases just samples or with just a small amount of physical inventory for immediate purchase) and other items and information are available through the system 5. Functioning within this role, a physical retailer has the potential to obtain additional profit sources beyond the markup received for sales of physical products within its current stock. For example, such a retailer can collect fees from: (1) manufacturers, wholesalers and/or distributors who essentially want to establish a virtual presence (e.g., as advisors 8) within retailer's physical site(s) (e.g., stores), so that they have direct access to their actual and potential customers at the point of decision-making; (2) other retailers (e.g., as sales commissions and/or as monthly fees for the privilege of being represented within the system 5) from whom the subject retailer's customers purchase products and/or services through the system 5 while within such retailer's physical site; and/or (3) for sales of information generated from the customer interactions through the system 5 (e.g., so that others can have better information about individuals' thought processes when considering a particular purchase).

Also, in addition to establishing relationships with sellers of products that compete with products sold by a particular retailer, that retailer can establish relationships with sellers of compatible products and/or services, e.g., for the purposes of: (1) providing their customers with even better advice and/or (2) cross-selling its customers who might also want or need such compatible products and/or services in addition to the particular product he or she is considering. More specifically, for example, a store that sells hardware or home-improvement items might use advisors 8 provided by a contractor firm. Similarly, a services firm (e.g., a computer consultant) might employ a system according to the present invention, using advisors 8 provided by sellers of related physical products (e.g., computer hardware).

In the foregoing embodiments, most of the processing is performed by the central server 10. A benefit of this configuration is that a single central server 10 can provide advisors 8 (e.g., customer-service representatives) for multiple different sites (e.g., retail shopping locations). However, in alternate embodiments, any or all of the processing previously described as being performed by central server 10 instead could be performed by local server 12, e.g., where the individual site wants to have greater control over the interactions involving its own users (e.g., customers) and/or the resulting information about those interactions or where it simply is desirable to offload some of the processing from central server 10.

In most of the embodiments discussed above, a system according to the present invention is deployed for use within "stores" or "shopping sites". Those terms, unless expressly qualified otherwise with regard to any particular usage herein, are intended to be construed broadly to encompass any commercial locations where sales-related activities take place. Currently, most stores and shopping sites are places where customers purchase items and then leave with their purchases. However, to some extent currently, and even more especially as stores and retail shopping sites evolve over time, e.g., due at least in part to future implementations of systems according to the present invention, such facilities can function more like, or even exclusively as, showrooms, e.g., with any combination of (1) physical product samples and (2) virtual exhibitions (such as on high-definition screens and/or three-dimensional or other virtual-reality presentations) of products, and with the customers sometimes (e.g., frequently, a majority of the time, or even always) just placing orders within such stores and retail shopping sites for later pickup at the same site or for delivery to their homes or other locations. Accordingly, any use of the term "store" or "shopping site" without further limitation herein also is intended to include, without limitation, these types of facilities. Also, although the present disclosure mainly focuses on retail sales, a system according to the present invention can be deployed in a facility that focuses on wholesale, industrial, commercial, professional, construction, contractor, or other types of sales.

System Environment

Generally speaking, except where clearly indicated otherwise, all of the systems, methods, functionality and techniques described herein can be practiced with the use of one or more programmable general-purpose computing devices. Such devices (e.g., including any of the electronic devices mentioned herein) typically will include, for example, at least some of the following components coupled to each other, e.g., via a common bus: (1) one or more central processing units (CPUs); (2) read-only memory (ROM); (3) random access memory (RAM); (4) other integrated or attached storage devices; (5) input/output software and circuitry for interfacing with other devices (e.g., using a hardwired connection, such as a serial port, a parallel port, a USB connection or a FireWire connection, or using a wireless protocol, such as radio-frequency identification (RFID), any other near-field communication (NFC) protocol, Bluetooth or a 802.11 protocol); (6) software and circuitry for connecting to one or more networks, e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system, which networks, in turn, in many embodiments of the invention, connect to the Internet or to any other networks; (7) a display (such as a cathode ray tube display, a liquid crystal display, an organic light-emitting display, a polymeric light-emitting display or any other thin-film display); (8) other output devices (such as one or more speakers, a headphone set, a laser or other light projector and/or a printer); (9) one or more input devices (such as a mouse, one or more physical switches or variable controls, a touchpad, tablet, touch-sensitive display or other pointing device, a keyboard, a keypad, a microphone and/or a camera or scanner); (10) a mass storage unit (such as a hard disk drive or a solid-state drive); (11) a real-time clock; (12) a removable storage read/write device (such as a flash drive, any other portable drive that utilizes semiconductor memory, a magnetic disk, a magnetic tape, an opto-magnetic disk, an optical disk, or the like); and/or (13) a modem (e.g., for sending faxes or for connecting to the Internet or to any other computer network). In operation, the process steps to implement the above methods and functionality, to the extent performed by such a general-purpose computer, typically initially are stored in mass storage (e.g., a hard disk or solid-state drive), are downloaded into RAM, and then are executed by the CPU out of RAM. However, in some cases the process steps initially are stored in RAM or ROM and/or are directly executed out of mass storage.

Suitable general-purpose programmable devices for use in implementing the present invention may be obtained from various vendors. In the various embodiments, different types of devices are used depending upon the size and complexity of the tasks. Such devices can include, e.g., mainframe computers, multiprocessor computers, one or more server boxes, workstations, personal (e.g., desktop, laptop, tablet or slate) computers and/or even smaller computers, such as personal digital assistants (PDAs), wireless telephones (e.g., smartphones) or any other programmable appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented by a general-purpose processor executing software and/or firmware, by dedicated (e.g., logic-based) hardware, or any combination of these approaches, with the particular implementation being selected based on known engineering tradeoffs. More specifically, where any process and/or functionality described above is implemented in a fixed, predetermined and/or logical manner, it can be accomplished by a processor executing programming (e.g., software or firmware), an appropriate arrangement of logic components (hardware), or any combination of the two, as will be readily appreciated by those skilled in the art. In other words, it is well-understood how to convert logical and/or arithmetic operations into instructions for performing such operations within a processor and/or into logic gate configurations for performing such operations; in fact, compilers typically are available for both kinds of conversions.

It should be understood that the present invention also relates to machine-readable tangible (or non-transitory) media on which are stored software or firmware program instructions (i.e., computer-executable process instructions) for performing the methods and functionality of this invention. Such media include, by way of example, magnetic disks, magnetic tape, optically readable media such as CDs and DVDs, or semiconductor memory such as various types of memory cards, USB flash memory devices, solid-state drives, etc. In each case, the medium may take the form of a portable item such as a miniature disk drive or a small disk, diskette, cassette, cartridge, card, stick etc., or it may take the form of a relatively larger or less-mobile item such as a hard disk drive, ROM or RAM provided in a computer or other device. As used herein, unless clearly noted otherwise, references to computer-executable process steps stored on a computer-readable or machine-readable medium are intended to encompass situations in which such process steps are stored on a single medium, as well as situations in which such process steps are stored across multiple media.

The foregoing description primarily emphasizes electronic computers and devices. However, it should be understood that any other computing or other type of device instead may be used, such as a device utilizing any combination of electronic, optical, biological and chemical processing that is capable of performing basic logical and/or arithmetic operations.

In addition, where the present disclosure refers to a processor, computer, server, server device, computer-readable medium or other storage device, client device, or any other kind of apparatus or device, such references should be understood as encompassing the use of plural such processors, computers, servers, server devices, computer-readable media or other storage devices, client devices, or any other such apparatuses or devices, except to the extent clearly indicated otherwise. For instance, a server generally can (and often will) be implemented using a single device or a cluster of server devices (either local or geographically dispersed), e.g., with appropriate load balancing. Similarly, a server device and a client device often will cooperate in executing the process steps of a complete method, e.g., with each such device having its own storage device(s) storing a portion of such process steps and its own processor(s) executing those process steps.

As used herein, the term "coupled", or any other form of the word, is intended to mean either directly connected or connected through one or more other elements or processing blocks. In the drawings and/or the discussions of them, where individual steps, modules or processing blocks are shown and/or discussed as being directly connected to each other, such connections should be understood as couplings, which may include additional elements and/or processing blocks.

Additional Considerations

In the preceding discussion, the terms "operators", "operations", "functions" and similar terms refer to process steps or hardware components, depending upon the particular implementation/embodiment.

In the event of any conflict or inconsistency between the disclosure explicitly set forth herein or in the attached drawings, on the one hand, and any materials incorporated by reference herein, on the other, the present disclosure shall take precedence. In the event of any conflict or inconsistency between the disclosures of any applications or patents incorporated by reference herein, the disclosure having the most recent priority date shall take precedence.

Unless clearly indicated to the contrary, words such as "optimal", "optimize", "maximize", "minimize", "best", as well as similar words and other words and suffixes denoting comparison, in the above discussion are not used in their absolute sense. Instead, such terms ordinarily are intended to be understood in light of any other potential constraints, such as user-specified constraints and objectives, as well as cost and processing or manufacturing constraints.

In certain instances, the foregoing description refers to clicking or double-clicking on user-interface buttons (typically in reference to desktop computers or laptops), touching icons (typically in reference to devices with touchscreens), dragging user-interface items, or otherwise entering commands or information via a particular user-interface element or mechanism and/or in a particular manner. All of such references are intended to be exemplary only, it being understood that each such reference, as well as each other aspect of the present invention as a whole, encompasses designation or entry of commands or information by a user in any of the ways mentioned herein or in any other known manner, using the same or any other user-interface element or mechanism, with different entry methods and different user-interface elements being most appropriate for different types of devices and/or in different situations. In addition, or instead, any and all references to inputting commands or information should be understood to encompass input by an automated (e.g., computer-executed) process.

In the above discussion, certain methods are explained by breaking them down into steps listed in a particular order. However, it should be noted that in each such case, except to the extent clearly indicated to the contrary or mandated by practical considerations (such as where the results from one step are necessary to perform another), the indicated order is not critical but, instead, that the described steps can be reordered and/or two or more of such steps can be performed concurrently.

References herein to a "criterion", "multiple criteria", "condition", "conditions" or similar words which are intended to trigger, limit, filter or otherwise affect processing steps, other actions, the subjects of processing steps or actions, or any other activity or data, are intended to mean "one or more", irrespective of whether the singular or the plural form has been used. For instance, any criterion or condition can include any combination (e.g., Boolean combination) of actions, events and/or occurrences (i.e., a multi-part criterion or condition).

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

In the discussions above, the words "include", "includes", "including", and all other forms of the word should not be understood as limiting, but rather any specific items following such words should be understood as being merely exemplary.

Several different embodiments of the present invention are described above and in the documents incorporated by reference herein, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the intent and the scope of the invention. Accordingly, the invention is not limited to the precise embodiments shown in the drawings and described above. Rather, it is intended that all such variations not departing from the intent of the invention are to be considered as within the scope thereof as limited solely by the claims appended hereto.

What is claimed is:

1. A system for providing remote location-based customer service for in-store customers, comprising:
   (a) a central server that maintains a site database and an advisor database;
   (b) a plurality of wireless transceivers coupled to said central server and disposed at different locations within each of a plurality of different retail shopping sites; and
   (c) a plurality of handheld wireless devices, carried by customers at said retail shopping sites and in wireless communication with said wireless transceivers;
   wherein the site database includes, for each particular wireless transceiver among said plurality of wireless transceivers, products within a communication range of said particular wireless transceiver,
   wherein the advisor database identifies customer service representatives and at least one of product categories or individual products about which said customer service representatives have been deemed qualified to provide advice,
   wherein each of said handheld wireless devices is configured with a user interface that allows a customer to designate a user-interface element to request a customer-service session,
   wherein upon designation of the user-interface element on any one of said handheld wireless devices, while said one of the handheld wireless devices is in wireless communication with any one of said wireless transceivers, the request is forwarded to the central server via said one of the wireless transceivers, along with transceiver information that comprises at least one of an identifier for or a location of said one of the wireless transceivers, and
   wherein upon receipt of said request, the central server: (i) uses the transceiver information to index into the site database and the advisor database to identify a customer-service representative, and then (ii) establishes a two-way real-time communication link between said one of the handheld wireless devices and said customer-service representative.

2. A system according to claim 1, wherein the user interface permits a customer: (i) to request a customer-service interaction generally pertaining to the retail shopping site within which the customer is located and, separately, (ii) to request a customer-service interaction pertaining only to a particular section of said retail shopping site in which the customer currently is located.

3. A system according to claim 2, wherein said particular section of the retail shopping site corresponds to an area covered by said one of the wireless transceivers.

4. A system according to claim 1, wherein each of a majority of said wireless transceivers has an unobstructed effective wireless range of not more than 25 feet.

5. A system according to claim 1, wherein a total area covered by each of a majority of said wireless transceivers is not more than 850 square feet.

6. A system according to claim 1, wherein each of a majority of the wireless transceivers within a given retail shopping site has an effective wireless range that is confined to a single shopping aisle within said given retail shopping site.

7. A system according to claim 1, wherein the two-way real-time communication link comprises real-time audio communication.

8. A system according to claim 7, wherein the user interface also permits the customer (a) to capture at least one of video or still images and (b) to transfer information obtained from said capture to the customer-service representative.

9. A system according to claim 8, wherein the user interface permits said transfer to occur during said two-way real-time audio communication.

10. A system according to claim 8, wherein the user interface permits said transfer to occur upon initiation of said two-way real-time audio communication link.

11. A system according to claim 1, wherein the customer-service representative has been designated as a specialist in a particular subject matter and has been selected based on a determination that the customer is located in a section of one of the retail shopping sites, said section including products pertaining to said particular subject matter.

12. A system according to claim 11, wherein based on said specialist designation, customer-service requests from a plurality of sections within different geographically dispersed ones of the retail shopping sites are directed to said customer-service representative, each of said plurality of sections including products pertaining to said particular subject matter.

13. A system according to claim 1, wherein said wireless transceivers are coupled to said central server via a wide-area network.

14. A system according to claim 1, wherein the central server selects the customer-service representative based on expertise ratings previously assigned to said customer-service representative.

15. A system according to claim 14, wherein the central server assigns an overall score based on the expertise ratings previously assigned to said customer-service representative for items within an area covered by said one of the wireless transceivers and selects the customer-service representative based on said overall score.

16. A system according to claim 15, wherein the central server assigns an overall score to each of a plurality of potential customer-service representatives based on the expertise ratings previously assigned to said potential customer-service representatives for items within the area covered by said one of the wireless transceivers and selects the customer-service representative based on a comparison of said overall scores for said plurality of potential customer-service representatives.

17. A system according to claim 1, wherein plural of said wireless transceivers include light sources for transmitting the messages of said wireless transceivers.

18. A system according to claim 17, wherein said light sources are light-emitting diodes.

19. A system according to claim 1, wherein the wireless transceivers within one of the retail shopping sites are coordinated with each other to provide for handoffs between said wireless transceivers as said customers move from a first space covered by a first one of said wireless transceivers to a second space covered by a second one of said wireless transceivers.

20. A system according to claim 1, wherein in a situation when areas covered by different wireless transceivers overlap, multiplexing is used to distinguish first communications from a first one of said wireless transceivers from second communications from a second one of said wireless transceivers.

* * * * *